United States Patent
Lydon et al.

(10) Patent No.: US 10,244,678 B2
(45) Date of Patent: Apr. 2, 2019

(54) BLADE GUARD FOR A ROBOT LAWNMOWER

(71) Applicant: iRobot Corporation, Bedford, MA (US)

(72) Inventors: Peter J. Lydon, Peabody, MA (US); Brian W. Doughty, Framingham, MA (US)

(73) Assignee: iRobot Corporation, Bedford, MA (US)

(*) Notice: Subject to any disclaimer, the term of this patent is extended or adjusted under 35 U.S.C. 154(b) by 0 days.

(21) Appl. No.: 15/793,261

(22) Filed: Oct. 25, 2017

(65) Prior Publication Data
US 2018/0054963 A1  Mar. 1, 2018

Related U.S. Application Data

(63) Continuation of application No. 15/246,947, filed on Aug. 25, 2016, now Pat. No. 9,807,930.

(51) Int. Cl.
*A01D 34/82* (2006.01)
*A01D 34/00* (2006.01)
*A01D 34/81* (2006.01)
*A01D 34/66* (2006.01)

(52) U.S. Cl.
CPC ......... *A01D 34/828* (2013.01); *A01D 34/008* (2013.01); *A01D 34/66* (2013.01); *A01D 34/81* (2013.01)

(58) Field of Classification Search
CPC ...... A01D 34/008; A01D 34/81; A01D 34/90; A01D 34/902; A01D 75/185; A01D 34/828
See application file for complete search history.

(56) References Cited

U.S. PATENT DOCUMENTS

| | | | | |
|---|---|---|---|---|
| 2,734,327 A | * | 2/1956 | Whitney | A01D 43/063 56/13.8 |
| 3,501,902 A | * | 3/1970 | Dahl | A01D 34/828 172/510 |
| 3,522,694 A | * | 8/1970 | Horn | A01D 34/828 56/16.9 |

(Continued)

FOREIGN PATENT DOCUMENTS

| DE | 10048866 | 4/2002 |
|---|---|---|
| EP | 1612631 | 1/2006 |

(Continued)

OTHER PUBLICATIONS

Bosch Indego User Manual, downloaded from www.manualslib.com, Nov. 23, 2012, 20 pages.

(Continued)

*Primary Examiner* — Alicia Torres
(74) *Attorney, Agent, or Firm* — Fish & Richardson P.C.

(57) ABSTRACT

An autonomous robot lawnmower includes a chassis, a drive supporting the chassis above a lawn and configured to maneuver the robot lawnmower about the lawn, and a motorized lawn cutting assembly including one or more blades. The robot lawnmower further includes a first blade guard movably mounted to a first lateral side of the chassis and extending from the chassis toward the lawn, and a second blade guard movably mounted to a second lateral side of the chassis and extending from the chassis toward the lawn.

32 Claims, 12 Drawing Sheets

(56) References Cited

U.S. PATENT DOCUMENTS

| | | | |
|---|---|---|---|
| 3,797,213 A | 3/1974 | Sadow et al. | |
| 3,927,513 A | 12/1975 | Ramaker | |
| 4,172,351 A | 10/1979 | Scanland | |
| 4,300,334 A * | 11/1981 | Hines | A01D 76/003 56/17.4 |
| 4,322,938 A * | 4/1982 | Efflandt | A01D 43/0631 56/17.4 |
| 4,545,453 A | 10/1985 | Yoshimura et al. | |
| 4,716,717 A | 1/1988 | Ogano | |
| 5,101,617 A | 4/1992 | Hare | |
| 5,499,494 A * | 3/1996 | Boshell | A01D 34/71 56/320.1 |
| 5,916,111 A | 6/1999 | Colens | |
| 6,140,146 A | 10/2000 | Brady et al. | |
| D451,931 S | 12/2001 | Abramson et al. | |
| 6,417,641 B2 | 7/2002 | Peless et al. | |
| 6,443,509 B1 | 9/2002 | Levin et al. | |
| 6,493,613 B2 | 12/2002 | Peless et al. | |
| 6,984,952 B2 | 1/2006 | Peless et al. | |
| 7,103,457 B2 | 9/2006 | Dean | |
| 7,155,309 B2 | 12/2006 | Peless et al. | |
| 7,239,944 B2 | 7/2007 | Dean | |
| D559,867 S | 1/2008 | Abramson | |
| 7,349,759 B2 | 3/2008 | Peless et al. | |
| D573,610 S | 7/2008 | Abramson | |
| 7,441,392 B2 | 10/2008 | Lilliestielke et al. | |
| 7,481,036 B2 | 1/2009 | Lilliestielke et al. | |
| 7,525,287 B2 | 4/2009 | Miyashita et al. | |
| 7,603,838 B1 * | 10/2009 | Henley, Jr. | A01D 43/16 56/13.7 |
| 7,729,801 B2 | 6/2010 | Abramson | |
| 8,046,103 B2 | 10/2011 | Abramson et al. | |
| D652,431 S | 1/2012 | Naslund | |
| D656,163 S | 3/2012 | Johansson et al. | |
| 8,136,333 B1 | 3/2012 | Levin et al. | |
| 8,306,659 B2 | 11/2012 | Abramson et al. | |
| 8,413,616 B2 | 4/2013 | Bergquist | |
| 8,532,822 B2 | 9/2013 | Abramson et al. | |
| 8,600,553 B2 | 12/2013 | Svendsen et al. | |
| 8,634,960 B2 | 1/2014 | Sandin et al. | |
| 8,676,378 B2 | 3/2014 | Tian et al. | |
| 8,781,627 B2 | 7/2014 | Sandin et al. | |
| 8,868,237 B2 | 10/2014 | Sandin et al. | |
| 8,938,318 B2 | 1/2015 | Bergstrom et al. | |
| 8,954,193 B2 | 2/2015 | Sandin et al. | |
| 9,807,930 B1 | 11/2017 | Lydon et al. | |
| 2001/0022506 A1 | 9/2001 | Peless et al. | |
| 2002/0140393 A1 | 10/2002 | Peless et al. | |
| 2003/0018423 A1 | 1/2003 | Saller | |
| 2003/0144774 A1 | 7/2003 | Trissel | |
| 2003/0208304 A1 | 11/2003 | Peless et al. | |
| 2004/0010343 A1 | 1/2004 | Dean | |
| 2004/0020000 A1 | 2/2004 | Jones | |
| 2004/0193348 A1 | 9/2004 | Gray | |
| 2005/0038578 A1 | 2/2005 | McMurtry | |
| 2005/0197766 A1 | 9/2005 | Fiann | |
| 2006/0090438 A1 | 5/2006 | Hunt | |
| 2007/0142964 A1 | 6/2007 | Abramson | |
| 2007/0150109 A1 | 6/2007 | Peless et al. | |
| 2008/0039974 A1 | 2/2008 | Sandin et al. | |
| 2008/0039991 A1 | 2/2008 | May | |
| 2008/0049217 A1 | 2/2008 | Cappelletti | |
| 2008/0097645 A1 | 4/2008 | Abramson et al. | |
| 2008/0109126 A1 | 5/2008 | Sandin | |
| 2008/0167753 A1 | 7/2008 | Peless et al. | |
| 2008/0183349 A1 | 7/2008 | Abramson et al. | |
| 2009/0254218 A1 | 10/2009 | Sandin et al. | |
| 2010/0059000 A1 | 3/2010 | Berquist | |
| 2011/0130875 A1 | 6/2011 | Abramson | |
| 2012/0023887 A1 | 2/2012 | Messina et al. | |
| 2012/0041594 A1 | 2/2012 | Abramson et al. | |
| 2012/0226381 A1 | 9/2012 | Abramson et al. | |
| 2013/0274920 A1 | 10/2013 | Abramson et al. | |
| 2013/0291506 A1 | 11/2013 | Johnson et al. | |
| 2014/0058611 A1 | 2/2014 | Borinato | |
| 2014/0102061 A1 | 4/2014 | Sandin et al. | |
| 2014/0102062 A1 | 4/2014 | Sandin et al. | |
| 2015/0006015 A1 | 1/2015 | Sandin et al. | |

FOREIGN PATENT DOCUMENTS

| | | |
|---|---|---|
| GB | 1267574 | 3/1972 |
| WO | 2001/070009 | 9/2001 |

OTHER PUBLICATIONS

International Search Report and Written Opinion in International Application No. PCT/US2016/059505, dated Dec. 29, 2016, 11 pages.
LawnBott User's Manual, Dec. 2009, 56 pages.
Robomow User Manual, Friendly Robotics, 2015, 56 pages.
Robomow, RS630 Description, https://usa.robomow.com/shop/uncategorized/rs6305/, May 31, 2017, 3 pages.

* cited by examiner

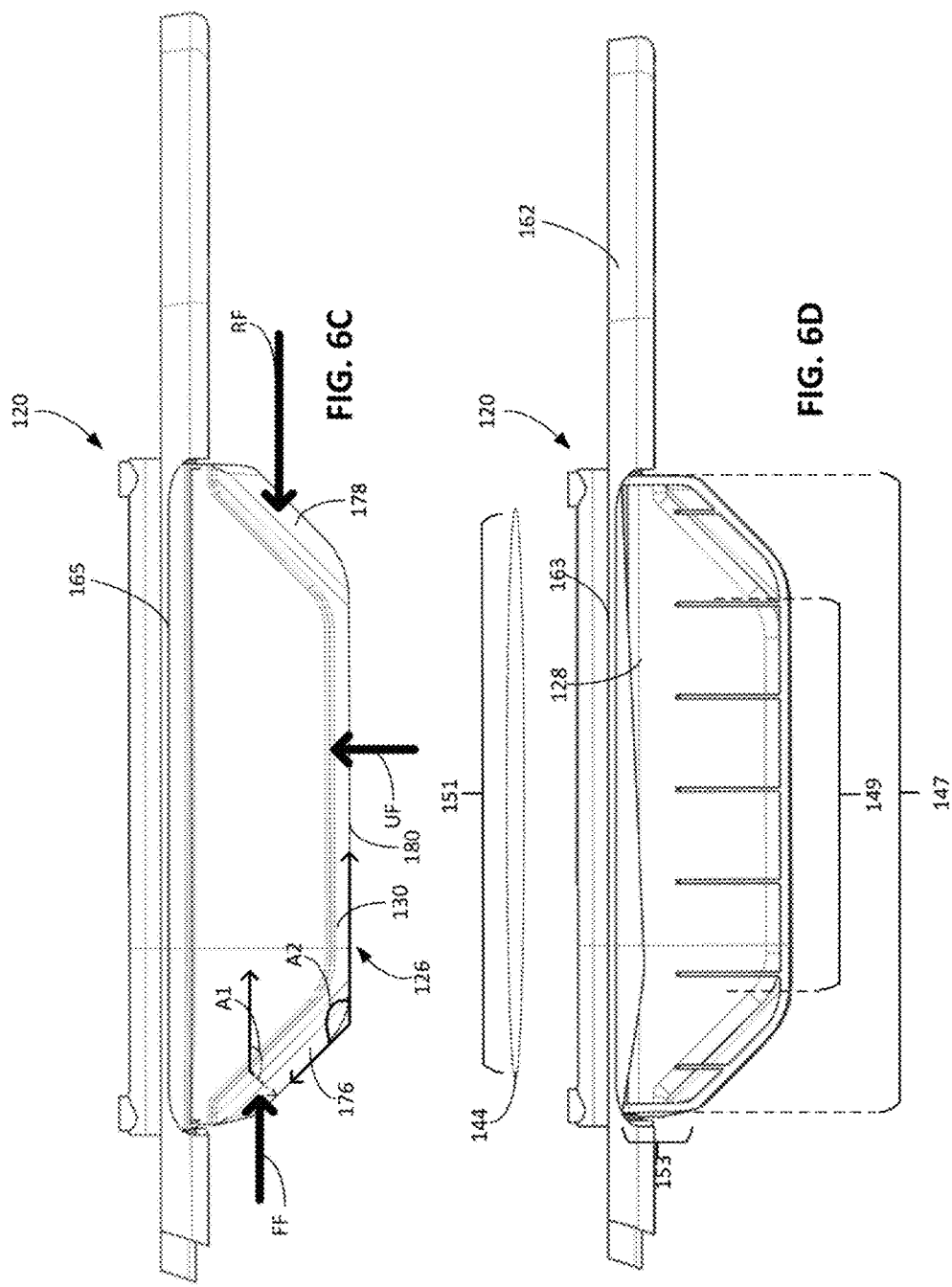

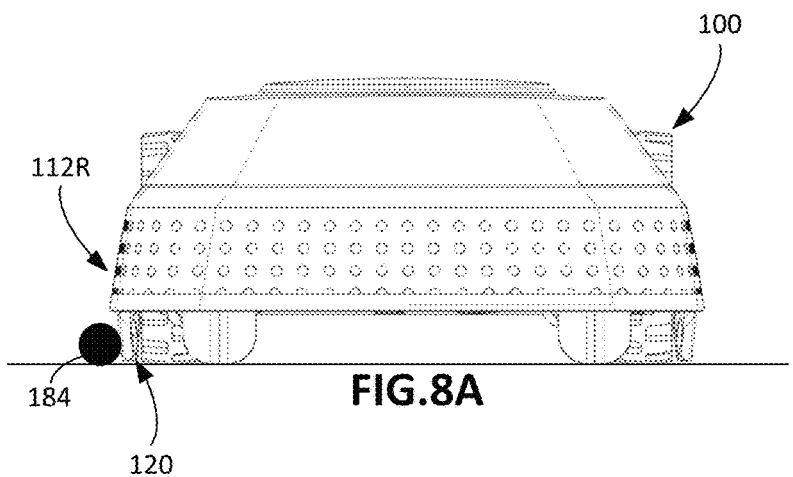
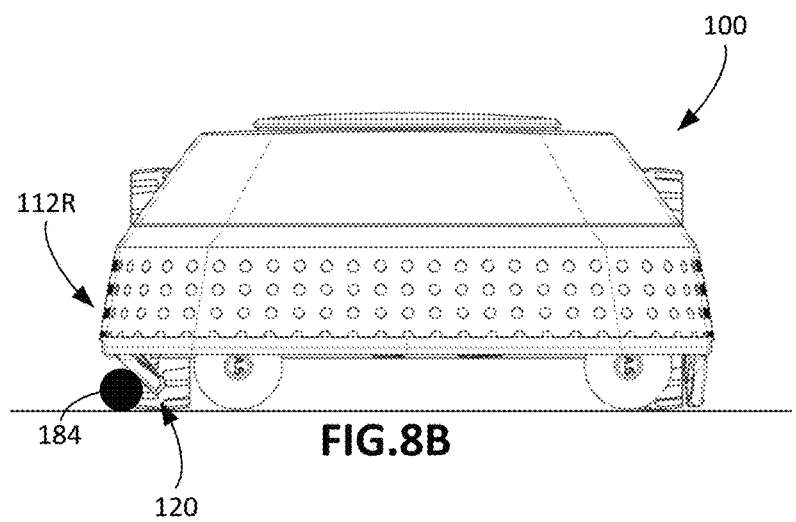
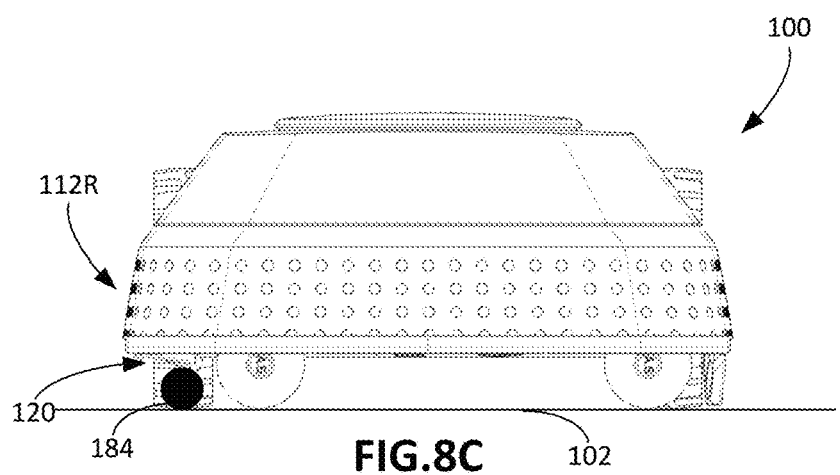

BLADE GUARD FOR A ROBOT LAWNMOWER

CROSS-REFERENCE TO RELATED APPLICATIONS

This application is a continuation application of and claims priority to U.S. application Ser. No. 15/246,947, filed on Aug. 25, 2016 the entire contents of which is hereby incorporated by reference.

TECHNICAL FIELD

This specification relates to a blade guard for a robot lawnmower.

BACKGROUND

An autonomous robot lawnmower can navigate about an environment to mow a lawn. After a user causes the robot lawnmower to initiate a cutting operation, the robot lawnmower autonomously controls rotation of blades to mow the lawn as the robot lawnmower autonomously navigates about the lawn. The user may manually interact with the robot lawnmower to reposition or to reorient the robot lawnmower.

SUMMARY

In one aspect, an autonomous robot lawnmower includes a chassis having a front and a back connected by first and second lateral sides, a drive supporting the chassis above a lawn and configured to maneuver the robot lawnmower about the lawn, and a motorized lawn cutting assembly including one or more blades. The robot lawnmower further includes a first blade guard movably mounted to the first lateral side of the chassis and extending from the chassis toward the lawn, and a second blade guard movably mounted to the second lateral side of the chassis and extending from the chassis toward the lawn. The first blade guard is movable toward the one or more blades of the cutting assembly such that a portion of the first blade guard is positioned between a first portion of the one or more blades of the cutting assembly and the lawn when an inwardly directed force is applied to the first blade guard. The second blade guard is movable toward the one or more blades of the cutting assembly such that a portion of the second blade guard is positioned between a second portion of the one or more blades of the cutting assembly and the lawn when an inwardly directed force is applied to the second blade guard.

In another aspect, an autonomous robot lawnmower includes a chassis, a bumper movably mounted to the chassis, a drive supporting the chassis above a lawn and configured to maneuver the robot lawnmower about the lawn, and a motorized lawn cutting assembly including one or more blades. The robot lawnmower further includes a blade guard movably mounted to the bumper such that a portion of the blade guard is positioned between a first portion of the one or more blades of the cutting assembly and the lawn when an inwardly directed force is applied to the blade guard.

Certain aspects include one or more implementations described herein and elsewhere.

In some implementations, the first blade guard includes a pair of extension springs rotatably and translatably mounting the first blade guard to the first lateral side of the chassis. The extension springs, for example, mount the first blade guard to the first lateral side of the chassis such that the extension springs are twisted in a first direction when the first blade guard is rotated toward the one or more blades of the cutting assembly. The extension springs, for example, mount the first blade guard to the first lateral side of the chassis such that the extension springs are twisted in a second direction when the first blade guard is rotated away from the one or more blades of the cutting assembly. The extension springs, for example, mount the first blade guard to the first lateral side of the chassis such that the extension springs are bent when the first blade guard translates away from the lawn and recedes into the chassis.

In some implementations, the portion of the first blade guard positioned between the first portion of the blade and the lawn when the inwardly directed force is applied to the first blade guard is positioned within a cutting circumference. The cutting circumference is, for example, defined by rotation of an outer tip of the one or more blades. In some cases, the outer tip of the one or more blades is positionable between 2 and 7 centimeters from an external surface of the first lateral side. The first blade guard, for example, has a height between 0 and 3 centimeters.

In some implementations, the first blade guard is movable away from the blade of the cutting assembly when an outwardly directed force is applied to the first blade guard.

In some implementations, the robot lawnmower further includes a bumper movably mounted to the chassis. The first blade guard and the second blade guard are, for example, each movably mounted to the bumper. In some cases, the bumper includes a bump sensor responsive to a bump force. The first blade guard is, for example, spring-mounted to the bumper such that rotation of the first blade guard does not activate the bump sensor.

In some implementations, the cutting assembly includes a housing to hold the one or more blades of the cutting assembly. The housing has, for example, a height above the lawn adjustable relative to a height of the chassis above the lawn.

In some implementations, the first blade guard is rotatably mounted to the chassis such that the first blade guard moves towards the one or more blades of the cutting assembly by rotating relative to the chassis. In some cases, the first blade guard is rotatable between a first position and a second position. The first blade guard in the first position, the first blade guard in the second position, and a rotational center of the first blade guard, for example, define an angle between 170 degrees and 190 degrees. In some cases, an inward rotation limit of the first blade guard is defined by contact between an inward facing surface of the first blade guard and the chassis. In some cases, the robot lawnmower further includes an extension spring having a first end coupled to the chassis and a second end coupled to the first blade guard. The first blade guard is, for example, translatable relative to the chassis such that the first blade guard recedes into the chassis and bends the extension spring when the first blade guard contacts an object. In some cases, the robot lawnmower further includes an extension spring having a first end coupled to the chassis and a second end coupled to the first blade guard. The extension spring is, for example, twistable when the first blade guard rotates relative to the chassis. In some cases, the first end of the extension spring is coupled to a threaded portion of the first blade guard. The second end of the extension spring is, for example, coupled to a threaded portion on the chassis.

In some implementations, the drive includes wheels supporting the chassis above the lawn, and a lower edge of the first blade guard is positioned at a height between 0 and 3 centimeters above the lawn.

In some implementations, the first blade guard has a front facing surface being angled away from an outward facing surface of the first blade guard such that a rearward directed force on the front facing surface moves the first blade guard towards the one or more blades of the cutting assembly. In some cases, the first blade guard has a rear facing surface being angled away from the outward facing surface of the first blade guard. In some cases, the front facing surface of the first blade guard is angled away from a lower edge of the first blade guard.

In some implementations, an outward facing surface of the first blade guard includes a recessed portion and a raised portion surrounding the recessed portion.

In some implementations, a cutting area is defined by operation of the one or more blades, the cutting area having a width between 75% and 95% of a distance between the first and second lateral sides.

Advantages of the foregoing may include, but are not limited to, those described below and herein elsewhere. The blade guards may help a user to avoid contact with the robot lawnmower's blades when the user manually interacts with the robot lawnmower. In particular, the blade guards may prevent hands of the user from contacting the blades. In comparison to a lawnmower without the blade guards, the robot lawnmower, having the blade guards, may enable the blades to be positioned more closely to the lateral sides of the robot lawnmower while keeping access to the blades restricted. By being positioned closer to the lateral sides, the blades may cut a relatively greater amount of grass and/or cut grass closer to the side of the robot lawnmower compared to blades that are not positioned as close to the lateral sides.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

FIG. 6C is a side view of the blade guard of FIG. 6A from a perspective outside of the robot lawnmower.

FIG. 6D is a side view of the blade guard of FIG. 6B from a perspective inside of the robot lawnmower.

FIGS. 8A to 8C are front views depicting an autonomous robot lawnmower contacting between an object and an outward facing surface of a blade guard of the robot lawnmower.

Like reference numbers and designations in the various drawings indicate like elements.

DETAILED DESCRIPTION

Robot lawnmowers can reduce the time needed to maintain lawns by autonomously maneuvering about the lawns to mow grass on the lawns. A robot lawnmower, for example, operates autonomously by navigating about a defined area to cut grass in the defined area, and returning to a base station between operations. While a robot lawnmower generally operates autonomously, at times it may be desirable for a user to interact with a robot lawnmower. A user may manually interact with a robot lawnmower, for instance, to pick up the robot lawnmower and reposition the robot lawnmower at a new location on the lawn. During this manual interaction in which the user lifts the robot lawnmower up from the lawn, the user may inadvertently contact devices, e.g., blades, rotating shafts, etc., positioned on an underside of the robot lawnmower used to perform the operation on the lawn. The examples of blade guards described herein may prevent or reduce the likelihood that the user inadvertently contacts the devices on the underside of the robot lawnmower. These examples of blade guards can also enable the blades of the robot lawnmower to be positioned closer to the edge without increasing the likelihood that the user inadvertently contacts these devices.

Figure 1:
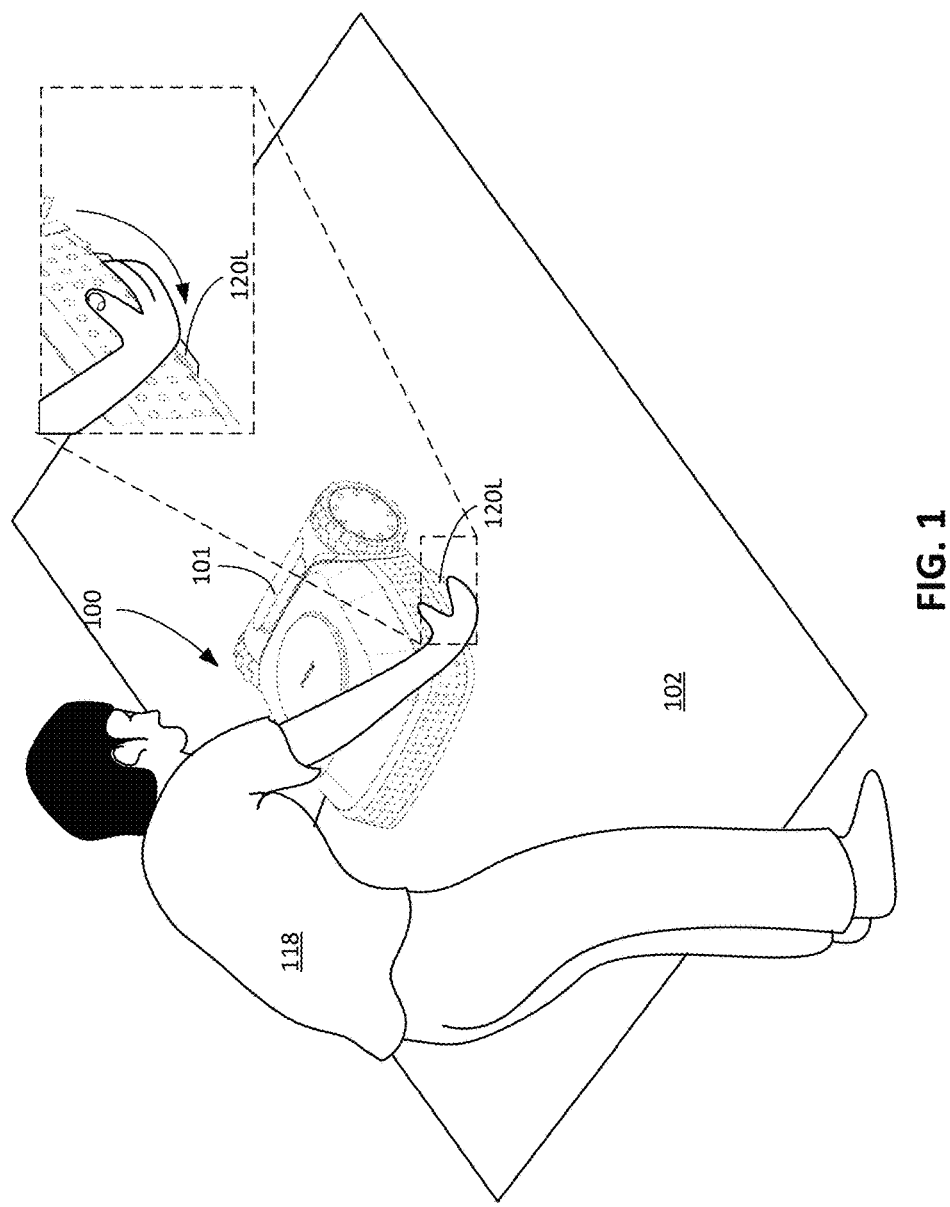
FIG. 1 is a perspective view of an autonomous robot lawnmower being lifted up from a lawn by a user.
Figure 3A:
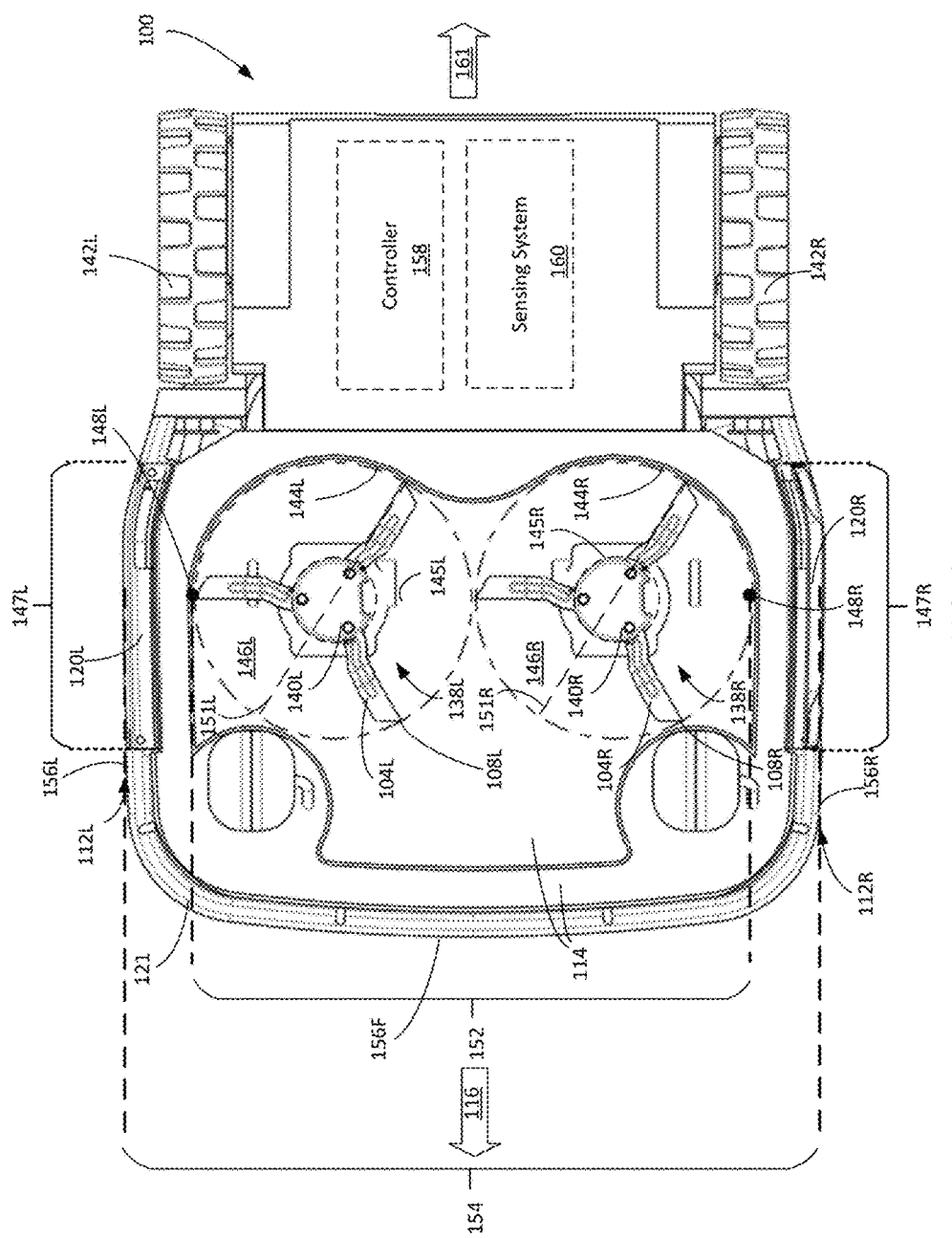
FIG. 3A is a bottom view of an autonomous robot lawnmower in which a blade guard is in an initial position.

FIG. 1 shows an autonomous robot lawnmower 100 configured to autonomously maneuver about a lawn 102 and to perform a cutting operation on grass on the lawn 102. Referring briefly to FIG. 3A, the robot lawnmower 100 includes blades 104R and/or blades 104L facing the lawn 102 that are rotated to perform the cutting operation when the robot lawnmower 100 is on the lawn 102. To cut a greater proportion of grass on the lawn 102 that the underside of the robot lawnmower 100 traverses, the blades 104R, 104L are arranged such that outer tips 108R, 108L of the blades 104R, 104L are proximate to lateral sides 112R, 112L of the robot lawnmower 100. As the robot lawnmower 100 moves in a forward direction 116 during the cutting operation, the outer tips 108R, 108L of the blades 104R, 104L being near the lateral sides 112R, 112L of the robot lawnmower 100 enables a width of a swath of the lawn 102 cut by the blades 104R, 104L to be closer to an overall width of the robot lawnmower, e.g., the distance between the lateral sides 112R, 112L.

As depicted in FIG. 1, a user 118 may manually interact with the robot lawnmower 100 before, during, or after the robot lawnmower 100 performs the cutting operation. While the robot lawnmower 100 has a handle 101 to lift the robot lawnmower, at times, the user 118 may use his or her hands to pick up the robot lawnmower 100 from the lawn 102 in other ways. To lift the robot lawnmower 100 from the lawn 102, the user 118 may reach under the robot lawnmower 100 using his or her hands to support the robot lawnmower 100 above the lawn 102. However, because the blades 104R, 104L may be positioned proximate to the lateral sides 112R, 112L, by lifting the robot lawnmower 100 from the lateral sides 112R, 112L, absent a blade guard, the user's hands may be positioned near the blades 104R, 104L of the robot lawnmower 100 when the user 118 handles the robot lawnmower 100. In some cases, if the lateral sides 112R, 112L do not include blade guards, the outer tips 108R, 108L of the blades 104R, 104L are positioned farther from the lateral sides 112R, 112L. Such positioning may reduce the swath of cut grass on the lawn 102 relative to the overall width of the robot lawnmower 100, requiring the lawnmower to make a larger number of overlapping turns to cover the same area covered in fewer turns by a lawnmower having a longer blades and a wider overall cutting swath. Blade guards (e.g., blade guard 120R, 120L shown in FIG. 3A) on the lateral sides 112R, 112L protect the user's hands by preventing the hands from contacting or accessing the blades 104R, 104L when the user 118 lifts with the robot lawnmower 100 or reaches into the underside of the robot lawnmower 100. Blade guards on the lateral sides 112R, 112L reduce the likelihood that the user's hand will inadvertently contact the blades 104R, 104L while enabling the outer tips 108R, 108L of the blades 104R, 104L to be positioned closer to the lateral sides 112R, 112L of the robot lawnmower 100.

Referring again to FIG. 3A, the blade guards include a left blade guard 120L positioned on the left lateral side 112L and a right blade guard 120R on the right lateral side 112R. The blade guards 120R, 120L are mounted such that they move relative to a chassis 114 of the robot lawnmower 100 in response to external forces. In some cases, the blade guards 120R, 120L are movably mounted to the chassis 114. The blade guards 120R, 120L are, for example, movably mounted to a bumper 121 that is movably mounted to the chassis 114. In some cases, the blade guards 120R, 120L are directly mounted to the chassis 114. The blade guards 120R, 120L are movable relative to the bumper 121, the chassis 114, or both the bumper 121 and the chassis 114. If the user 118 grasps the robot lawnmower 100 from the lateral sides 112L, 112R, the user's hands engage the blade guards 120R, 120L. When the user's hands engage the blade guards 120R, 120L, the blade guards 120R, 120L move relative to the blades 104R, 104L. As the blade guards 120R, 120L move due to the contact with the user's hands, the blade guards 120R, 120L block the user's hands from contacting the blades 104R, 104L.

Figure 2A:
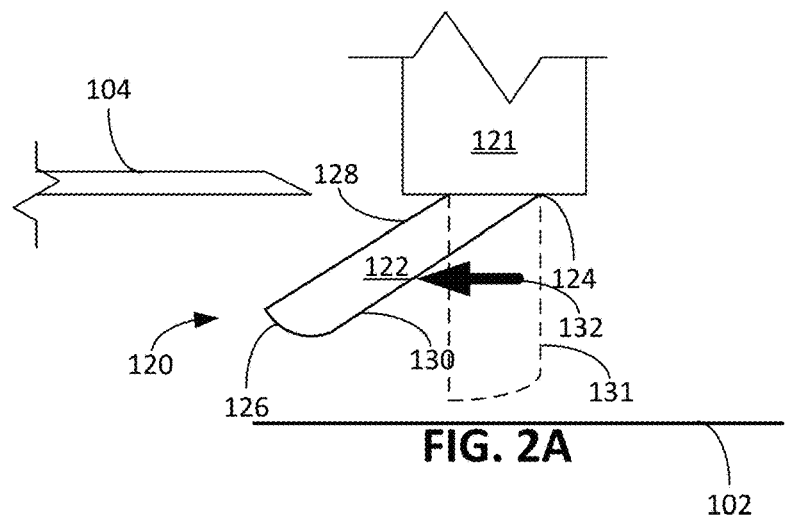
FIGS. 2A, 2B, and 2C are schematic front views of a blade guard rotating inward toward a blade, rotating outward away from a blade, and translating upward away from a lawn, respectively.
Figure 2B:
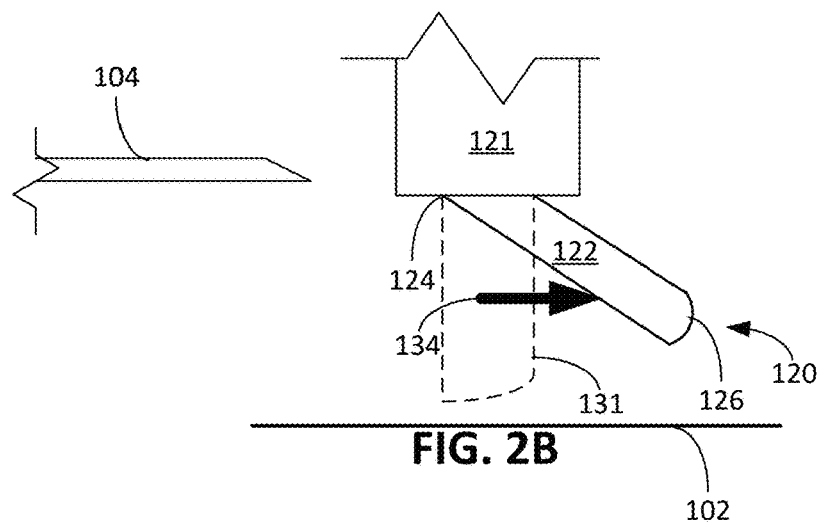
Figure 2C:
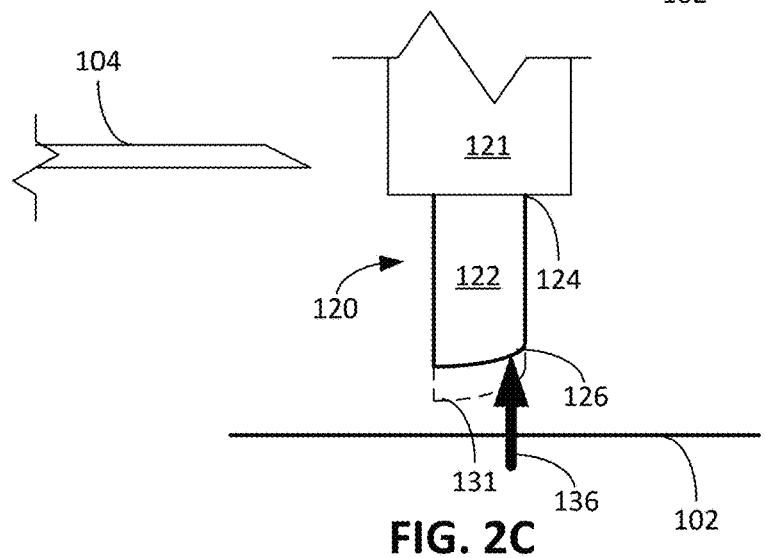

FIGS. 2A to 2C illustrate example modes of movement of a blade guard 120 (which corresponds to, e.g., the blade guard 120R and/or the blade guard 120L) relative to the bumper 121 and/or the chassis 114 of the robot lawnmower 100 and/or a blade 104 (which corresponds to, for example, one of the blades 104R or one of the blades 104L in a position most proximate to the blade guard 120). The blade guard 120 includes a body 122 extending from the bumper 121 toward the lawn 102. The blade guard 120 is mounted to the bumper 121 at a proximal end 124 and extends to a free distal end 126. While the examples of FIGS. 2A to 2C depict a single blade 104 and a single blade guard 120, the movements described in these examples are applicable to both of the blade guards 120R, 120L (shown in FIG. 3A) and each of the blades 104R, 104L.

When the blade guard 120 is movably mounted to the bumper 121, a force on the blade guard 120, e.g., on an inward facing surface 128 or an outward facing surface 130 of the blade guard 120, causes the blade guard 120 to move relative to the bumper 121. In some examples, the blade guard 120 is movable toward the blade 104 from an initial position 131 of the blade guard 120. In the example shown in FIG. 2A, an inwardly directed force 132 on the blade guard 120 causes the blade guard 120 to move toward the blade 104. The inwardly directed force 132 alternatively or additionally causes the blade guard 120 to move away from the lawn 102. The blade guard 120 is, for example, pivotably mounted to the bumper 121 of the robot lawnmower 100 at the proximal end 124 of the blade guard 120 such that the blade guard 120 rotates relative to the chassis 114 toward the blade 104 when the inwardly directed force 132 is applied to the outward facing surface 130 of the blade guard 120. When the blade guard 120 rotates in response to the inwardly directed force 132, the distal end 126 of the blade guard 120 moves toward the blade 104 and away from the lawn 102, thereby causing the body 122 of the blade guard 120 to move between the blade 104 and the lawn 102.

The inwardly directed force 132 on the blade guard 120 is caused by, for example, engagement between the user's hands and the outward facing surface 130 of the blade guard 120 when the user 118 grabs the robot lawnmower 100 from the lateral sides 112R, 112L. The rotation of the blade guard 120 enables the body 122 to be positioned between the blade 104 and the lawn 102. In some cases, the body 122 of the blade guard 120 in this position inhibits contact between the user's hands and the blade 104.

In some implementations, as the robot lawnmower 100 autonomously navigates about the lawn 102 to perform the cutting operation, the blade guard 120 of the robot lawnmower 100 contacts an object positioned on the lawn 102. The contact with the object causes the resultant inwardly directed force 132 on the blade guard 120 and the inward rotation of the blade guard 120. In some cases, the blade guard 120 moves away from the lawn 102 a sufficient distance such that the blade guard 120 moves over the object, and, as the robot lawnmower 100 moves in the forward direction 116, the blade guard 120 moves past the object. Thus, the blade guard 120 can protect the blades of the robot lawnmower 100 from contacting such objects.

Alternatively or additionally, the blade guard 120 is movable relative to the chassis of the robot lawnmower 100 to avoid impeding autonomous movement of the robot lawnmower 100. The blade guard 120 is, for instance, movable away from the blade 104 from the initial position 131. In the example shown in FIG. 2B, an outwardly directed force 134 on the blade guard 120 causes the blade guard 120 to move away from the blade 104. The outwardly directed force 134, causes the blade guard 120 to move away from the lawn 102. The blade guard 120 is, for example, pivotably mounted to the bumper 121 of the robot lawnmower 100 at the proximal end 124 of the blade guard 120 such that the blade guard 120 rotates relative to the chassis 114 when the outwardly directed force 134 is applied to the blade guard 120. When the blade guard 120 rotates in response to the outwardly directed force 134, the distal end 126 of the blade guard 120 moves away from the blade 104 and away from the lawn 102. The outward rotation of the blade guard 120 increases a distance between an outermost part of the robot lawnmower 100 and the blade 104, e.g., the distance between the blade guard 120 and the blade 104 when the blade guard 120 is rotated outward. This increased distance prevents the user's fingers from reaching the blade 104.

The outwardly directed force 134 on the blade guard 120 is caused by, for example, contact between the blade guard 120 and an object (e.g., a ground contour, rock or a stick) as the robot lawnmower 100 autonomously navigates about the lawn 102 during the cutting operation. When the object contacts the inward facing surface 128, the resulting outwardly directed force 134 on the blade guard 120 causes the rotation of the blade guard 120 and thereby causes the blade guard 120 to move away from the lawn 102. In some cases, the blade guard 120 moves away from the lawn 102 a sufficient distance such that the blade guard 120 moves over the object, and, as the robot lawnmower 100 moves in the forward direction 116, the blade guard 120 moves past the object. Absent this outward rotation, the blade guard 120 would absorb the force and transfer that to the bumper 121, triggering the bumper sensor to stop movement of the robotic lawnmower 100 and stop rotation of the blades 104.

In some examples, the blade guard 120 is movable into the chassis 114 of the robot lawnmower 100 from its initial position 131. In the example shown in FIG. 2C, an upwardly directed force 136 on the blade guard 120 causes the blade guard 120 to recede into the chassis (e.g., the chassis 114 shown in FIG. 3A) and/or the bumper 121 of the robot lawnmower 100. The blade guard 120 is, for example, mounted to the bumper 121 of the robot lawnmower 100 such that the blade guard 120 translates relative to the chassis of the robot lawnmower 100 when the upwardly directed force 136 is applied to the blade guard 120. When the blade guard 120 translates relative to the chassis, the distal end 126 of the blade guard 120 moves away from the lawn 102 and towards the chassis 114. Absent this upward movement, the blade guard 120 would absorb the force and transfer that to the bumper 121, triggering the bumper sensor to stop movement of the robotic lawnmower 100 and stop rotation of the blades 104.

The upwardly directed force 136 on the blade guard 120 is caused by, for example, contact between the blade guard 120 and an object as the robot lawnmower 100 autonomously navigates about the lawn 102. The object, for example, contacts the distal end 126 of the blade guard 120 and causes the upwardly directed force 136 on the blade guard 120, which in turn causes the blade guard 120 to recede into the chassis 114 and move away from the lawn 102. In some cases, the blade guard 120 moves away from the lawn 102 a sufficient distance such that the blade guard 120 moves over the object, and, as the robot lawnmower 100 moves in the forward direction 116, the blade guard 120 moves past the object.

By only blocking contact with the blade 104 in response to an inwardly directed force 132, the blade guard 120 does not impede the cutting function of the blade 104 during normal operations, e.g., absent the inwardly directed force 132. Similarly, by moving in response to an outwardly directed force 134 and an upwardly directed force 136, the blade guard 120 moves around objects that, for example, do not have a height sufficient to contact the blade 104. The outward and upward modes of movement of the blade guard 120 may thus prevent the blade guard 120 from impeding autonomous movement of the robot lawnmower 100 due to objects that do not a pose a risk to damaging the blade 104.

Figure 3B:
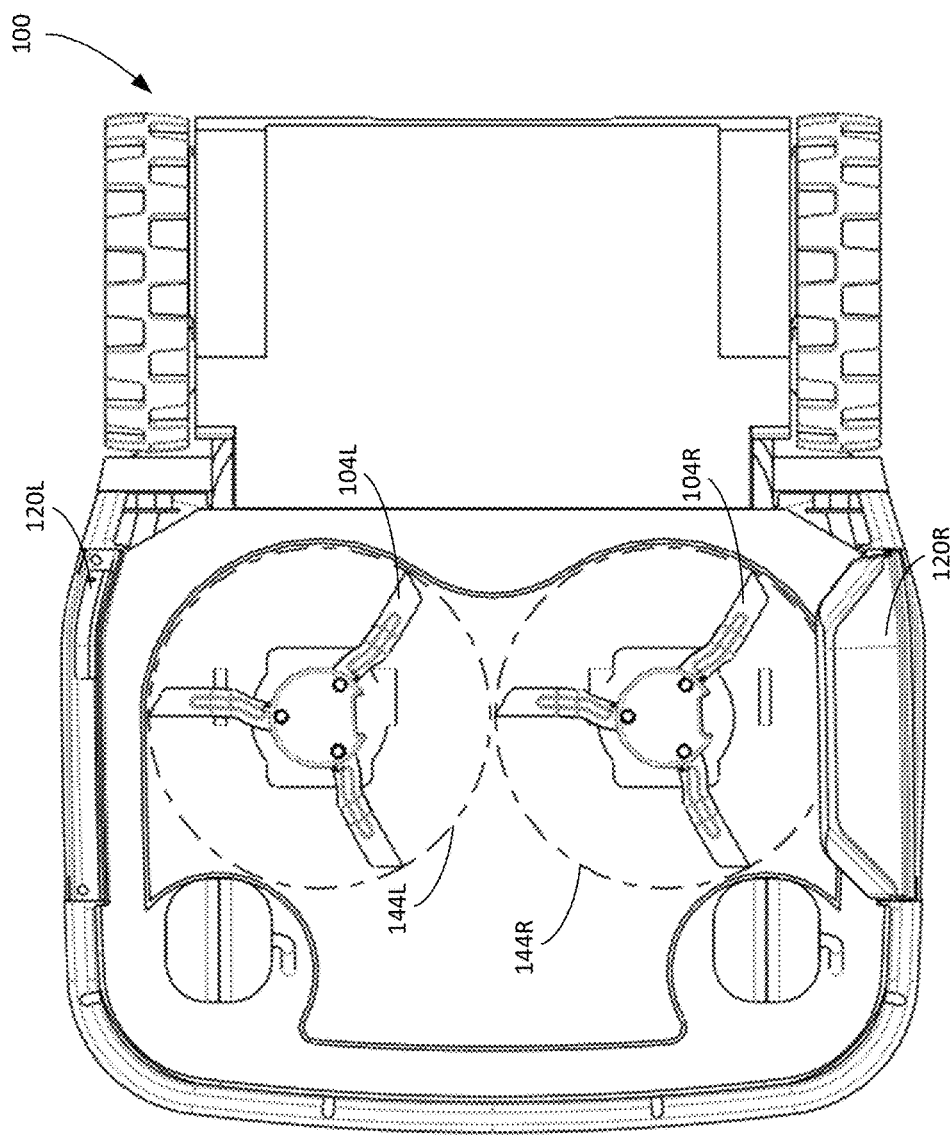
FIG. 3B is a bottom view of the autonomous robot lawnmower of FIG. 3A in which the blade guard is in a terminal inward position.

Referring to FIGS. 3A, 3B, the blades 104R, 104L rotate during a cutting operation of the robot lawnmower 100. Contact between certain objects and the blades 104R, 104L while the blades 104R, 104L rotate may cause damage to the blades 104R, 104L or to the objects. In the example shown in FIGS. 3A and 3B, the blades 104R, 104L are part of motorized lawn cutting assemblies 138R, 138L, respectively. Each cutting assembly 138R, 138L includes a housing 140R, 140L to which the blades 104R, 104L are mounted. The housings 140R, 140L are connected to one or more motors (not shown) fixed within the chassis 114 of the robot lawnmower 100. The motors drive the housings 140R, 140L to cause the blades 104R, 104L to rotate during the cutting operation. A controller 158 controls the motors to rotate the blades 104R, 104L.

During operation, drive wheels 142R, 142L are also driven to cause the robot lawnmower 100 to move across the lawn 102. The drive wheels 142R, 142L are differentially controllable to allow the robot lawnmower 100 to turn and reorient itself. The controller 158 of the robot lawnmower 100 controls, for example, one or more motors coupled to the drive wheels 142R, 142L to move the robot lawnmower 100 autonomously about the lawn 102. In some implementations, the user manually initiates autonomous operation of the robot lawnmower 100, e.g., using a remote control, a user input button on the robot lawnmower, or other appropriate user input devices. When the autonomous operation is initiated, the controller 158 controls the operations of the robot lawnmower 100 to cause the robot lawnmower to move about the lawn 102 and to perform a cutting operation. The controller 158, for example, operates the drive wheels 142R, 142L while operating the cutting assemblies 138R, 138L to autonomously move across the lawn 102 while cutting grass on the lawn 102. In some implementations, the controller 158 operates the drive wheels 142R, 142L to cause the robot lawnmower 100 to return to a base station, e.g., a docking station. When the robot lawnmower 100 is docked to the docking station, the docking station charges a battery source of the robot lawnmower 100 to provide energy to the robot lawnmower 100 to perform a subsequent cutting operation or to continue a cutting operation.

When the blades 104R, 104L rotate during the cutting operation, the outer tips 108R, 108L of the blades 104R, 104L sweep through a horizontal plane above the lawn 102. The blades' outer tips 108R, 108L, for example, sweep through cutting circumferences 144R, 144L within the horizontal plane. Cutting areas 146R, 146L within the cutting circumferences 144R, 144L and outside a housing circumference 145R, 145L define the swath of the lawn 102 cut by the blades 104R, 104L as the robot lawnmower 100 moves during the cutting operation. In particular, the cutting areas 146R, 146L have a combined cutting width 152, e.g., the distance extending from a leftmost point 148L and the rightmost point 148R that the outer tips 108R, 108L of the blades 104R, 104L can reach when the blades 104R, 104L are rotated.

The blade guards 120R, 120L enable the blades 104R, 104L to be positioned near lateral external surfaces 156R, 156L on the lateral sides 112R, 112L of the robot lawnmower 100. As described herein, the blade guards 120R, 120L prevent objects inserted under the robot lawnmower 100 and/or the hands of users who reach around the lateral sides 112R, 112L of the robot lawnmower 100 from contacting the blades 104R, 104L. While it would be possible to prevent contact between the blades 104R, 104L and such objects by positioning the blades 104R, 104L a greater distance inward from the lateral sides 112R, 112L, such positioning would cause the blades 104R, 104L to rotate through a relatively smaller overall cutting area (e.g., the combination of the cutting areas 146R, 146L) and would decrease cutting width 152. The blade guards 120R, 120L hence may enable the robot lawnmower 100 to achieve a greater ratio of the cutting width 152 to an overall width 154 of the robot lawnmower 100.

The overall width 154 corresponds to a distance between the external surface 156R and the external surface 156L. The overall width 154 corresponds to, for example, a distance between lateral sides 112R, 112L of the robot lawnmower 100, e.g., a distance between a right lateral side of the bumper 121 and a left lateral side of the bumper 121. The overall width 154 is between, for example, 40 centimeters and 70 centimeters (e.g., between 40 centimeters and 50 centimeters, 50 centimeters and 60 centimeters, 60 centimeters and 70 centimeters, approximately 50 centimeters, approximately 55 centimeters, approximately 60 centimeters, etc.). The cutting width 152 is between, for example, 30 centimeters and 65 centimeters (e.g., between 30 centimeters and 40 centimeters, 40 centimeters and 50 centimeters, 50 centimeters and 60 centimeters, 50 centimeters and 65 centimeters, approximately 40 centimeters, approximately 45 centimeters, approximately 50 centimeters, etc.). The percentage of the cutting width 152 with respect to the overall width 154 is between, for example, 75% and 95% (e.g., between 75% and 85%, 80% and 90%, 85% and 95%, etc.). In some cases, a robot lawnmower without blade guards has a percentage of cutting width with respect to overall width between 60% and 70%, or less.

To prevent objects from contacting the blades 104R, 104L, the blade guards 120R, 120L extend across lateral lengths 147R, 147L, respectively, across the lateral sides 112R, 112L. The lengths 147R, 147L are sufficiently long for covering the sweep arc of the blades 104R, 104L when the blades 104R, 104L are rotating. For example, the lengths 147R, 147L are, for example, greater than diameters 151R, 151L of the cutting circumferences 144R, 144L. A ratio of the length 147R, 147L to the diameter 151R, 151L of the cutting circumference 144R, 144L is between at least, for example, 1.1 and 1.5 (e.g., between 1.1 and 1.3, between 1.3 and 1.5, etc.).

In some implementations, the lengths 147R, 147L of the blade guards 120R, 120L are a function of the cutting diameters 151R, 151L. In some implementations, to test whether a robot lawnmower meets a blade protection standard, a test probe is positioned against the blade guards 120R, 120L to determine whether the test probe may access the blades 104R, 104L, e.g., intersect with the cutting diameters 151R, 151L. If the blade guards 120R, 120L are mounted to the bumper 121, the test probe extends from a lateral edge of the bumper 121 inward toward the blades 104R, 104L by a predetermined length. The robot lawnmower successfully meets the blade protection standard if the test probe does not contact the blades 104R, 104L. The predetermined length is, for instance, 75 millimeters. In some cases, when the cutting diameter 151R, 151L is increased, the shape of the blade sweep arc asymptotically approaches the shape of a substantially flat line such that a greater portion of the cutting circumference 144R, 144L is within the predetermined length, e.g., the amount of extension of the test probe from the bumper edge. Assuming (i) the blades 104R, 104L are at the same height as the bottom of the bumper 121, (ii) the lateral wall of the bumper 121 is a straight line, and (iii) the robot lawnmower does not include an additional mechanism to inhibit the test probe from contacting the blades 104R, 104L, the minimum guard width at the bottom of the bumper 121 for meeting the blade protection standard would be, for example:

$$\text{Minimum Guard Width} = 2 \times \sqrt{\left(L + \frac{D}{2}\right)^2 - \left(\frac{D}{2} + 0\right)^2}$$

where: L is the probe length, D is the cutting blade sweep diameter, and O is the offset between a tangent edge of a circumference of the blade sweep and a bumper edge.

The outer tips 108R, 108L are positionable a predefined distance from the external surfaces 156R, 156L of the lateral sides 112R, 112L. For example, when the blades 104L are rotated, the outer tips 108L sweep through the leftmost point 148L, and the rightmost point 148L is located at the predefined distance from the external surface 156L of the left lateral side 112L. Similarly, when the blades 104R are rotated, the outer tips 108R sweep through the rightmost point 148R, and the rightmost point 148R is also located at the predefined distance from the external surface 156R of the right lateral side 112R. The predefined distance between these points 148R, 148L and the external surface 156R, 156L is between, for example, 2.0 centimeters and 7.0 centimeters (e.g., between 2 centimeters and 3.5 centimeters, 3.5 centimeters and 5 centimeters, 5 centimeters and 7 centimeters, etc.).

In some implementations, each of the blade guards 120R, 120L is movable such that at least a portion of the body (e.g., the body 122 of FIG. 2A) of the blade guard 120 is positioned within the cutting circumference 144R, 144L) of the blades 104R, 104L. FIG. 3A depicts the blade guard 120R in its initial position, e.g., a neutral position of the blade guard 120R mounted to the bumper 121 absent external forces that would cause movement of the blade guard 120R relative to the bumper 121. FIG. 3B depicts the blade guard 120R rotated inward to a terminal position or an innermost rotational position in which the blade guard 120R is unable to rotate inwardly further.

In the initial position of FIG. 3A, the blade guard 120R is not positioned within the cutting circumference 144R, e.g., positioned within a vertical projection of the cutting circumference 144R. In the terminal position of FIG. 3B, at least a portion of the body of the blade guard 120R and the distal end of the blade guard 120R are positioned within the cutting circumference 144R. To allow the blade guard 120R to be positioned within the cutting circumference 144R, the body of the blade guard 120R has a vertical length (e.g., corresponding to a distance between the proximal end 124 of the blade guard 120 and the distal end 126 of the blade guard 120 shown in FIGS. 2A to 2C) of, for example, 1 centimeter to 4 centimeters (e.g., 1 centimeter to 2 centimeters, 2 centimeters to 3 centimeters, or 3 centimeters to 4 centimeters, etc.). By being at least partially positioned within the cutting circumference 144R in their terminal positions, the blade guards 120R, 120L block hands of the user 118 or other external objects from contacting the blades 104R, 104L while enabling the blades 104R to reach and cut grass on the lawn 102 under the chassis 114, proximate the external surface 156R. In addition, in their terminal positions, the distal ends of the blade guards 120R, 120L are positioned within the vertical projection of the cutting circumference and below the horizontal plane in which the blades 104R, 104L are located, for example, between the horizontal plane and the lawn 102.

In some implementations, as the robot lawnmower 100 moves about the lawn 102 during the cutting operation, the bumper 121 may contact objects on non-mowable portions of the lawn 102 (e.g., rocks, tree trunks, planters, sprinkler heads, swing sets, etc.). The bumper 121 defines at least in part the external surfaces of the robot lawnmower 100. The bumper 121, for example, defines a forward external surface 156F and at least a portion of lateral external surfaces 156R, 156L on the lateral sides 112R, 112L, respectively. As the robot lawnmower 100 moves about the lawn 102, e.g., in the forward direction 116, the bumper 121 of the robot lawnmower 100 contacts non-mowable objects on the lawn 102, triggering a bump sensor and alerting the robot lawnmower 100 to their presence. The controller stops rotation of the blades 104R, 104L in response to activation of the bump sensor.

In some cases, the bumper 121 is movable relative to the chassis 114. In some implementations, the bumper 121 is movable relative to the chassis 114 in a rearward direction 161 such that contact with objects in the forward direction 116 causes the bumper 121 to move in the rearward direction 161 relative to the chassis 114. The bumper 121 is, in some cases, spring-mounted such that the springs mounting the bumper 121 to the chassis 114 absorb forces caused by impact of the bumper 121 with objects on the lawn 102. In some implementations, the bumper 121 is movable relative to the chassis 114 in an upward direction and/or a downward direction. In this regard, an object that wedges between the bumper 121 and the lawn 102 causes the bumper 121 to move in the upward direction relative to the chassis 114. An overhung object that causes the bumper 121 to wedge between the lawn 102 and the object results in movement of the bumper 121 in the downward direction relative to the chassis 114.

In some implementations, a sensing system 160 of the robot lawnmower 100 includes sensors to detect contact with or proximity to the non-mowable objects on the lawn 102. The sensing system 160 includes, for example, acoustic or optical ranging sensors that measure properties of scattered light to enable the controller 158 to estimate a distance between the robot lawnmower 100 and nearby non-mowable objects. In some examples, the sensing system 160 includes one or more bump sensors associated with the bumper 121 that detect when the bumper 121 has moved relative to the chassis 114. The bump sensors are, for example, displacement sensors that generate signals indicative of contact with objects on the lawn 102, a degree of contact with the objects, and a directionality of the contact. Using signals from the bump sensor or other sensors of the sensing system 160, the controller 158 navigates the robot lawnmower 100 to avoid contact or further contact with objects on the lawn 102.

As described herein, the blade guards 120R, 120L are movably mounted to the chassis 114. The blade guards 120R, 120L are, for instance, directly mounted to the chassis 114 or are mounted to the bumper 121, which in turn is mounted to the chassis 114. FIGS. 4 to 10C depict examples of structures and operations of the blade guard 120. While the blade guard 120 is shown in these figures as corresponding to the right blade guard 120R, examples of the left blade guard 120L include structures and operations similar to those described with respect to the blade guard 120 in FIGS. 4 to 10C.

Figure 4:
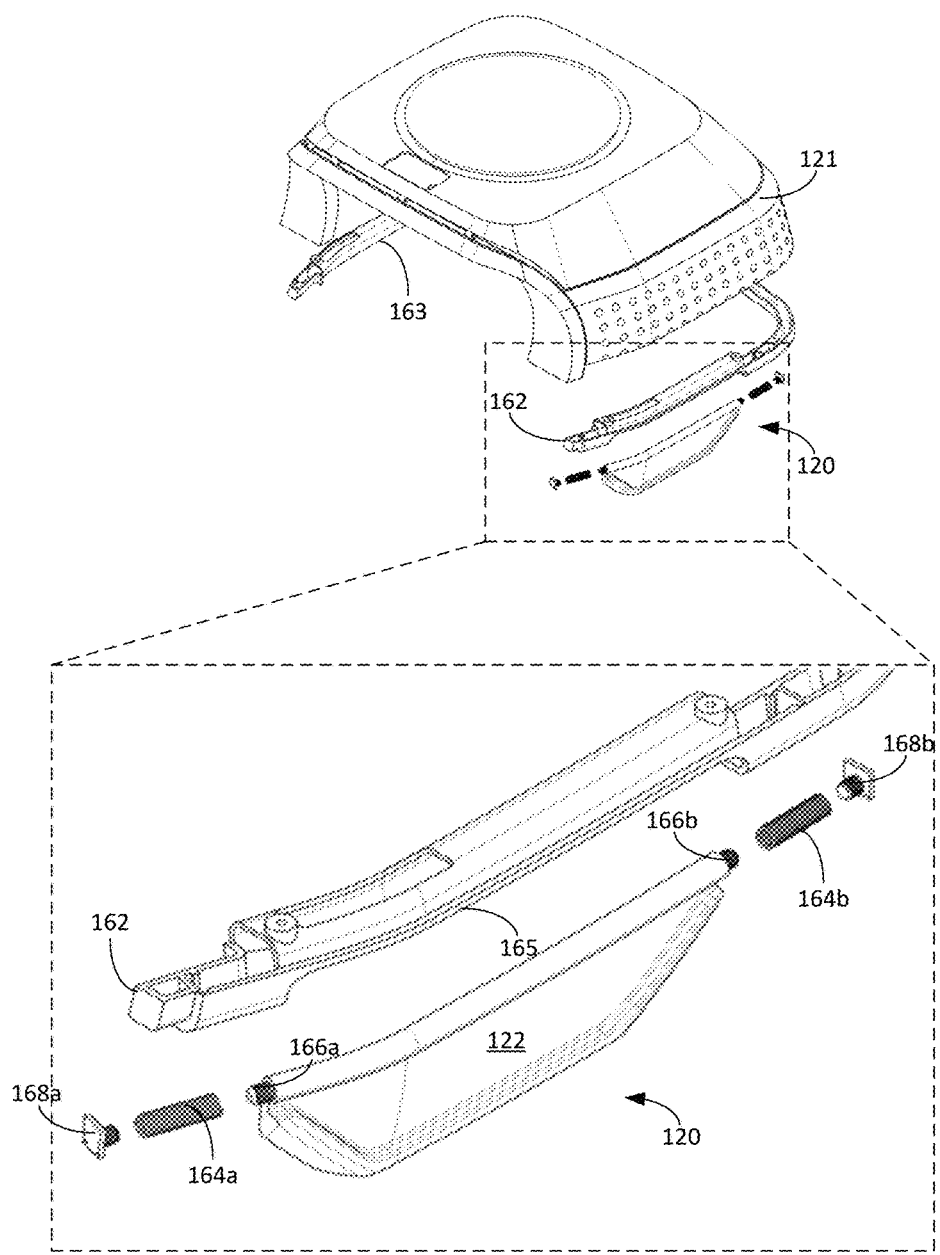
FIG. 4 is an exploded top perspective view of a bumper, a frame, and a blade guard.
Figure 5:
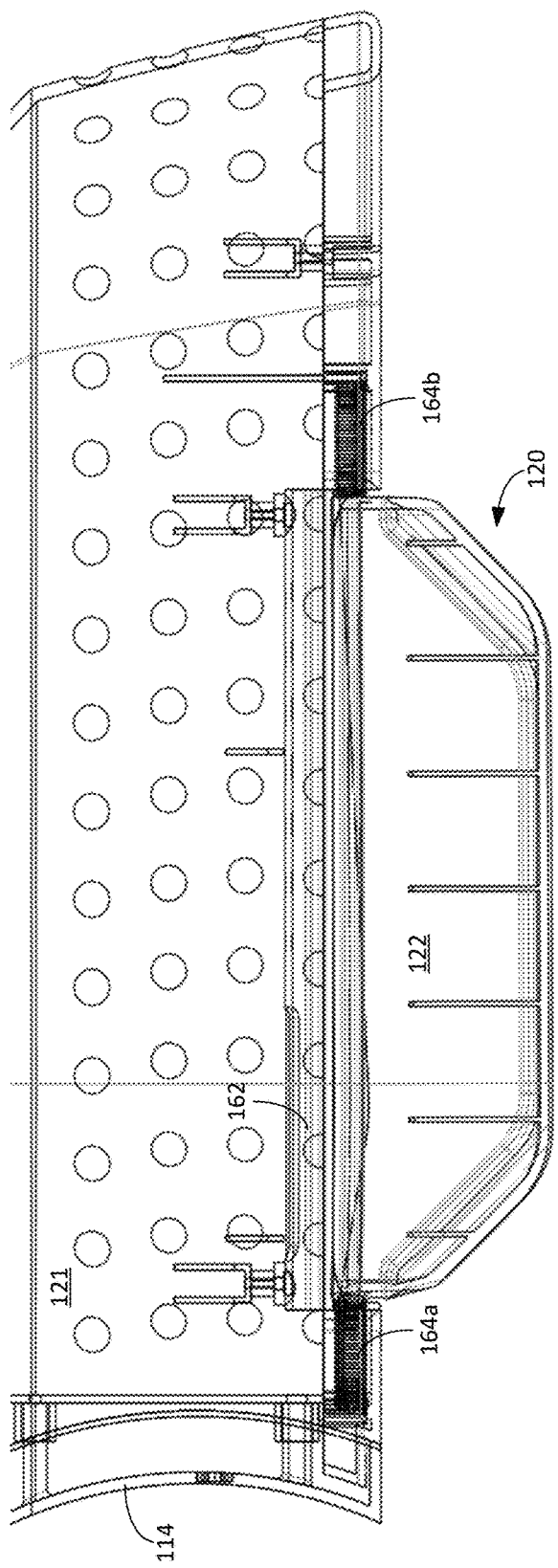
FIG. 5 is a transparent side view of a bumper, a frame, and a blade guard.

FIGS. 4 and 5 depict an example of a way of mounting the blade guard 120 to the chassis 114 and/or the bumper 121. Referring to FIG. 4 depicting an exploded view of the bumper 121 and the blade guard 120 of the robot lawnmower 100, the blade guard 120 is mounted to a frame 162, to which the other blade guard of the robot lawnmower 100 is also mounted. In the example of FIG. 4, the frame 162 is directly mounted to the bumper 121, which, as described herein, is moveably mounted to the chassis 114. In some cases, the frame 162 is directly mounted to the chassis 114. The frame 162 is, for example, fixed to the bumper 121 such that relative movement between the frame 162 and the bumper 121 is inhibited. In some implementations, rather than being mounted to the frame 162, the blade guard 120 is directly mounted to the bumper 121 and/or the chassis 114.

Also referring to FIG. 6D, which shows a side view of the blade guard 120 from a perspective inside of the robot lawnmower 100, the frame 162 includes an inner edge 163 (also shown in FIGS. 4 and 6B) that limits the inward rotation of the blade guard 120 (a motion described with respect to FIG. 2A). The inner edge 163 corresponds to, for example, an edge on an interior of a lower surface of the frame 162 that faces the blade guard 120 and the lawn 102. In particular, the inward facing surface 128 of the blade guard 120 contacts the inner edge 163 at an innermost rotational position of the blade guard 120. For example, an inward rotation limit of the blade guard 120 is defined by contact between the inward facing surface 128 of the blade guard 120 and the frame 162. In some implementations, this inward rotation limit is defined by contact between the inward facing surface 128 of the blade guard 120 and the chassis 114. In some cases, the inward rotation limit defined by contact between the inward facing surface 128 and the bumper 121. If the blade guard 120 is only rotatable inward toward the blade 104, the blade guard 120 is capable of rotating inward from its initial position about its proximal end by an angle of, for example, 75 degrees to 90 degrees (e.g., 75 to 80 degrees, 80 to 85 degrees, 85 to 90 degrees, etc.).

Figure 6A:
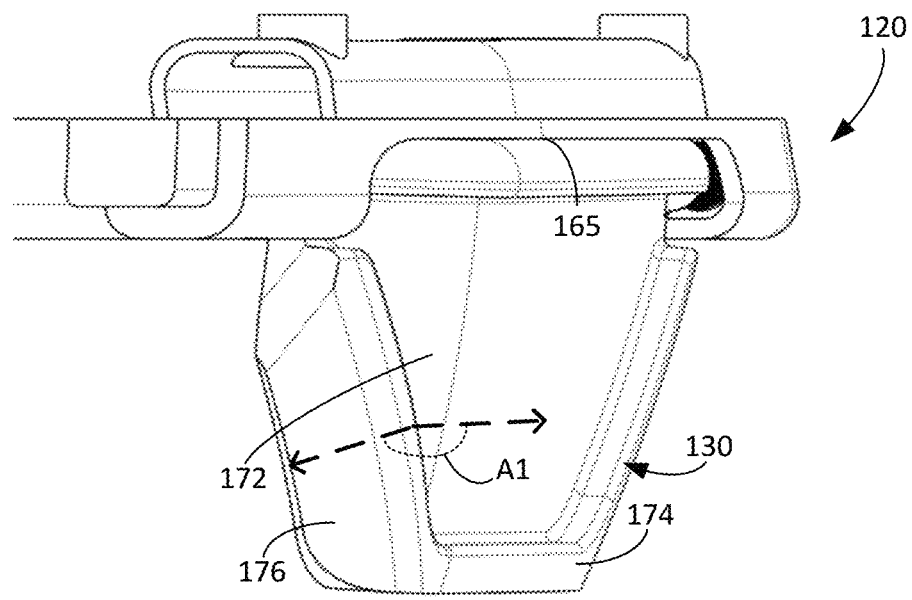
FIG. 6A is a rear-right perspective view of a blade guard isolated from an autonomous robot lawnmower.

If the blade guard 120 is also rotatable outward (as described with respect to FIG. 2B), referring to FIG. 6C which shows a side view of the blade guard 120 from a perspective outside of the robot lawnmower 100, an outer edge 165 (also shown in FIGS. 4, 6A, and 6B) limits the amount of outward rotation of the blade guard 120. In particular, the outward facing surface 130 of the blade guard 120 contacts the outer edge 165 at an outermost rotational position of the blade guard 120. In this regard, the blade guard 120 is capable of rotating outward from its initial position about its proximal end by an angle of, for example, 75 degrees to 90 degrees (e.g., 75 to 80 degrees, 80 to 85 degrees, or 85 to 90 degrees). In some implementations, the chassis 114 or the bumper 121 limits the outward rotation of the blade guard 120. Contact between the chassis 114 and the blade guard 120 and/or between the bumper 121 and the blade guard 120, for example, defines the outermost position of the blade guard 120.

In some implementations, the blade guard 120 is rotatable about its proximal end 124 over an angle between 150 degrees and 190 degrees (e.g., 150 to 170 degrees or 170 to 190 degrees). This angle is defined by, for example, the angle swept by the distal end of the blade guard 120 in the blade guard's innermost position to the blade guard's outermost position, the blade guard 120 a rotating about a point corresponding to the axis of rotation of the proximal end 124 of the blade guard 120.

Figure 6B:
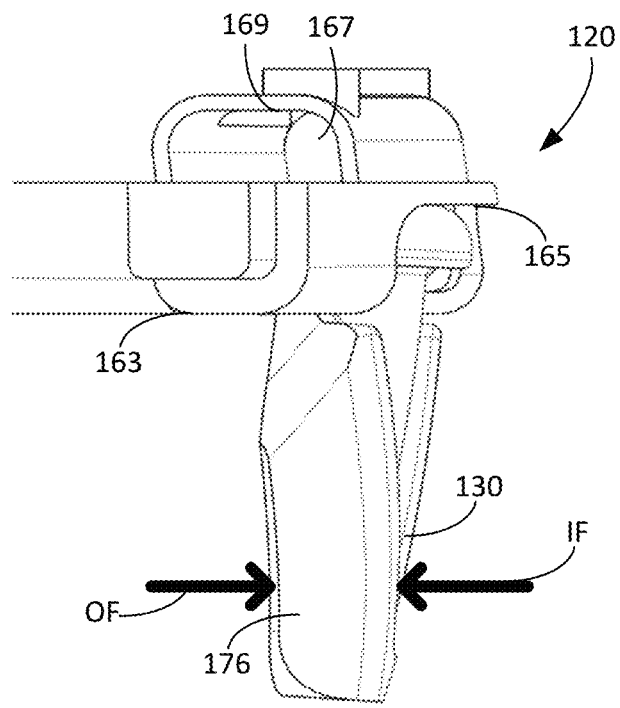
FIG. 6B is a rear view of the blade guard of FIG. 6A.

If the blade guard 120 is translatable upward or downward relative to the frame 162 and the bumper 121 (described with respect to FIG. 2C), referring to FIG. 6B, a recess 167 of the frame 162 limits the amount of translation of the blade guard 120. In this regard, the blade guard 120 is capable translating from its initial position, into the recess 167, and away from the lawn 102 by a distance of, for example, 0.5 centimeters to 4.5 centimeter (e.g., 0.5 centimeters to 1.5 centimeters, 1.5 centimeters to 2.5 centimeters, 2.5 centimeters to 3.5 centimeters, 3.5 centimeters to 4.5 centimeters, 1 centimeter to 3 centimeters, approximately 2 centimeters, etc.). In some implementations, the distal end 126 of the blade guard 120 has an initial height above the lawn 102 of 0 centimeters to 3 centimeters (e.g., 0 centimeters to 1 centimeter, 0 centimeters to 2 centimeters, 0.5 centimeters to 1.5 centimeters, etc.). In some implementations, the blade guard 120 is movable to a maximum height above the lawn 102 of 1 centimeter to 5 centimeters (e.g., 1 centimeter to 3 centimeters, 3 centimeters to 5 centimeters, 2 centimeters to 4 centimeters, approximately 3 centimeters, etc.), the maximum height being defined by contact between the blade guard 120 and the portion 169 of the frame 162 defining the recess 167. In some implementations, the amount that recess 167 limits translation of the blade guard 120 is defined by the relative location of the chassis 114 or the bumper 121. Contact between the blade guard 120 and the chassis 114 and/or between the bumper 121 and the blade guard 120, for example, defines the maximum height.

Because the frame 162 is fixed to the bumper 121, and the inner edge 163, the outer edge 165, and/or the recess 167 limit the movement of the blade guard 120, in some cases, a force on the blade guard 120 transfers directly to the bumper 121 through the frame 162. For example, if an inwardly directed force IF (shown in FIG. 6B) on the blade guard 120 causes the inward facing surface 128 of the blade guard 120 to contact the inner edge 163 of the frame 162, the contact causes the force to transfer through the frame 162. The force then causes the bumper 121 to move relative to the chassis 114 a sufficient amount to trigger the bump sensors. Similarly, if an outwardly directed force OF (shown in FIG. 6B) on the blade guard 120 causes the outward facing surface 130 of the blade guard to contact the outer edge 165 of the frame 162, in some cases, the contact causes the force to move the bumper 121 relative to the chassis a sufficient amount to trigger the bump sensors. Also similarly, if an upwardly directed force UF (shown in FIG. 6C) on the blade guard 120 causes an inner surface of the blade guard 120 to contact the portion 169 of the frame 162 defining the recess 167, in some instances, the contact causes the force to move the bumper 121 upward relative to the chassis a sufficient amount to trigger the bump sensors.

In some implementations, referring to FIGS. 4 and 5, the blade guard 120 is spring-mounted to the frame 162. The blade guard 120 includes a pair of extension springs 164a, 164b each having a first end attached to the body 122 of the blade guard 120 and a second end attached to the frame 162.

The extension springs 164a, 164b are twistable such that the extension springs 164a, 164b are twisted when the body 122 of the blade guard 120 rotates relative to the frame 162. If the blade guard 120 is rotatable inward toward the blades 104R, 104L and outward away from the blades 104R, 104L, the extension springs 164a, 164b are twistable in both directions about their longitudinal axes. The twisting of the extension springs 164a, 164b enable the rotational movements of the blade guard 120 described with respect to FIGS. 2A and 2B. Referring to FIGS. 2A, 2B, 4, and 5, in this regard, the extension springs 164a, 164b are twisted in a first direction when the blade guard 120 is rotated toward the blade 104, and are twisted in a second direction when the blade guard 120 is rotated away from the blade 104. Once the force causing the rotation of the blade guard 120 is released, the extension springs 164a, 164b retract and the blade guard 120 returns to its initial position.

In some implementations, the extension springs 164a, 164b are deflectable along their longitudinal axes such that the first ends of the extension springs 164a, 164b are movable upward or downward relative to the second ends of the extension springs 164a, 164b. The deflection of the extension springs 164a, 164b enable the upward translation movement of the blade guard 120 described with respect to FIG. 2C. In particular, the extension springs 164a, 164b bend when the blade guard 120 translates away from the lawn 102 and recedes into a recess 167 on the frame 162. The blade guard 120 also recedes into the chassis 114 when the blade guard 120 translates into the recess 167 of the frame 162. Once the force causing this translation is released, the extension springs 164a, 164b are released, and the blade guard 120 to returns to its initial, or resting, position.

In some implementations, the body 122 of the blade guard 120 includes bosses 166a, 166b that fits into corresponding openings on one end of each of the extension springs 164a, 164b. The frame 162 also includes bosses 168a, 168b that fit into the other opening of each the extension springs 164a, 164b. This combinations of bosses 166a, 166b, 168a, 168b couples the springs 164a, 164b to the frame 162 and the blade guard 120. In some examples, the bosses 166a, 166b and the bosses 168b, 168b are threaded to engage wires of the extension springs 164a, 164b. The bosses 166a, 166b are, for example, threaded portions of the body 122 of the blade guard 120, and the bosses 168a, 168b are, for example, threaded portions of the frame 162. The threaded engagement between the bosses 166a, 166b and the extension springs 164a, 164b reduce relative rotation of the first ends of the extension springs 164a, 164b and the body 122 of the blade guard 120. The threaded engagement between the bosses 168a, 168b and the extension springs 164a, 164b reduce relative rotation of the second ends of the extension springs 164a, 164b and the frame 162.

Examples of geometry and structure of the blade guard 120 is described in detail with respect to FIGS. 6A to 6D, which show the blade guard 120 and the frame 162 isolated from the robot lawnmower. FIG. 6A shows a side-front perspective view of the blade guard 120. FIG. 6B shows a front view of the blade guard 120. FIG. 6C shows a side view of the blade guard 120 from a perspective outside of the robot lawnmower. FIG. 6D shows a side view of the blade guard 120 from a perspective inside of the robot lawnmower.

As shown illustrated in FIG. 6A, in some implementations, the outward facing surface 130 of the blade guard 120 includes a recessed portion 172 and a raised portion 174 surrounding the recessed portion 172 on three sides. When the user 118 manually interacts with the blade guard 120, the combination of the raised portion 174 and the recessed portion 172 assist the user in maintaining contact with the blade guard 120. For example, as a user's hands or other objects slide along the outward facing surface 130, e.g., along the recessed portion 172, the raised portion 170 of the outward facing surface 130 inhibits the hands or other objects from passing beyond the distal end of the blade guard 120 and losing contact with the blade guard 120. The combination of the raised portion 174 and the recessed portion 172 thus prevent contact between the user's hands or other foreign objects and the blades 104R, 104L.

Referring to both FIGS. 6A and 6C, in some implementations, the blade guard 120 includes a rear facing surface 176 angled away from the outward facing surface 130. In this regard, the rear facing surface 176 and the outward facing surface 130 form an angle A1 greater than 90 degrees, for example, between 100 degrees and 170 degrees (e.g., between 100 degrees and 135 degrees or between 135 degrees and 170 degrees). For example, in the side view of FIG. 6C, the plane defined by the rear facing surface 176 (going into the page as shown in FIG. 6C) and the plane defined by the outward facing surface 130 (parallel to the page as shown in FIG. 6C) intersect to form the angle A1.

Such an angle enables a forward directed force FF (shown in FIG. 6C) on the rear facing surface 176 to cause inward rotation of the blade guard 120.

Similarly, in some implementations, a front facing surface 178 of the blade guard 120 is angled away from the outward facing surface 130 and forms a similar angle with the outward facing surface 130. Such an angle enables a rearward directed force RF (shown in FIG. 6C) on the front facing surface 178 to cause inward rotation of the blade guard 120. In other words, when one of the angled surfaces 176, 178 contacts a stationary object, the slope of the surface as defined by angle A1 directs the motion of the blade guard 120 such that the angled surface 176, 178 rides up on the object and the blade guard 120 rotates inward toward the blades 104R, 104L.

Referring to FIG. 6C, in some implementations, the rear facing surface 176 is angled away from a lower edge 180 of the blade guard 120 at the distal end 126 of the blade guard 120. This angle A2 is between, for example, between 100 degrees and 170 degrees (e.g., between 100 degrees and 135 degrees or between 135 degrees and 170 degrees). The angle A2 between the rear facing surface 176 and the lower edge 180 enables objects of various heights to contact the rear facing surface 176 and cause upward translation of the blade guard 120 when the robot lawnmower is moving in the rearward direction. Similarly, the front facing surface 178 of the blade guard 120 in some cases forms a similar angle with the lower edge 180 to enable objects of various heights to contact the front facing surface 178 and cause upward translation of the blade guard 120 when the robot lawnmower is moving in the forward direction.

Referring to FIG. 6D, in some implementations, the lower edge 180 of the blade guard 120 has a length 149, and an upper portion 153 of the blade guard 120 extends across the length 147 (e.g., corresponding to the lengths 147R, 147L described with respect to FIG. 3B). The length 149 of the lower edge 180 is, for example, 5 centimeters to 20 centimeters (e.g., 5 centimeters to 15 centimeters, 10 centimeters to 20 centimeters, etc.).

The length 149 of the lower edge 180, in some cases, is less than a diameter 151 of a cutting circumference 144 (depicted in FIG. 6D as an oval for illustration purposes) of the blades of the robot lawnmower 100. The diameter 151 is, for example, greater than the length 149 of the lower edge and less than the length 147. A ratio of the length 149 of the lower edge 180 to the diameter 151 is between, for example, 0.5 and 1.5 (e.g., between 0.5 and 0.7, between 0.7 and 0.9, 0.9 to 1.1, 1.1 to 1.3, 1.3 to 1.5, etc.).

Various scenarios during operation of the robot lawnmower 100 in which the blade guard 120 moves relative to the bumper 121 or the chassis 114 are described herein. FIGS. 7A to 7C, FIGS. 8A to 8C, FIGS. 9A to 9C, and FIGS. 10A to 10C depict sequences of examples of these scenarios.

Figure 7A:
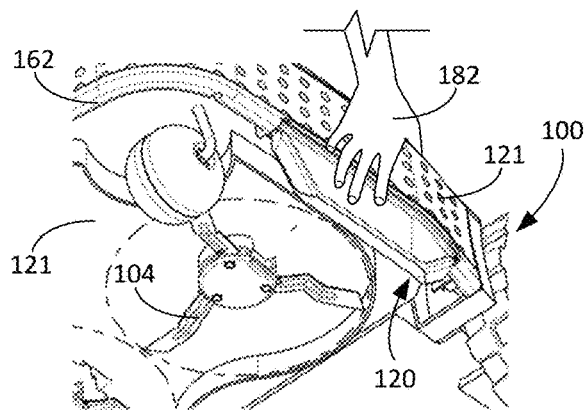
FIGS. 7A to 7C are bottom perspective views of an autonomous robot lawnmower depicting a manual interaction between a user and a blade guard of the robot lawnmower.
Figure 7B:
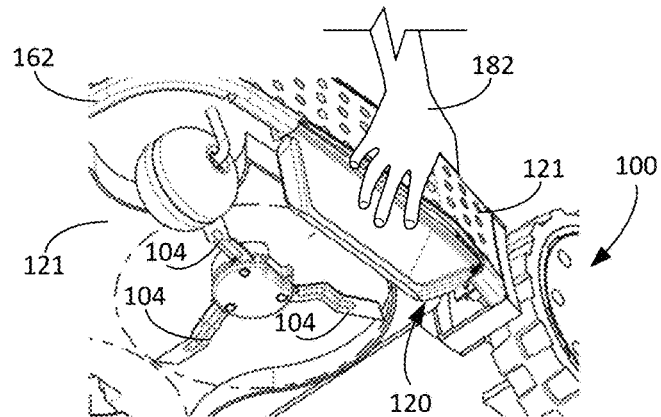
Figure 7C:
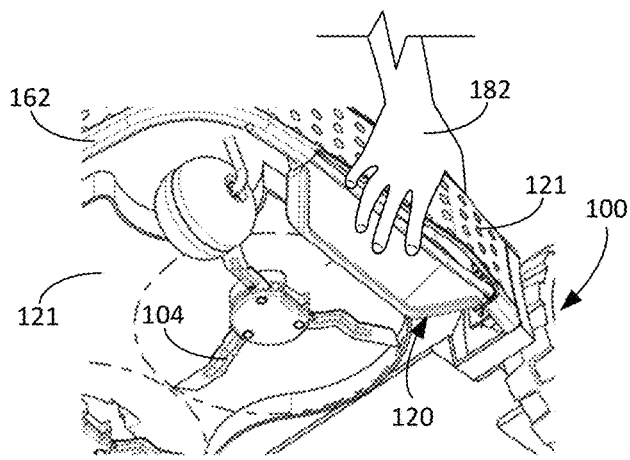

As described with respect to FIG. 1, when the user 118 grasps the robot lawnmower 100 from the lateral sides 112R, 112L, the user's hands, contact the blade guards and cause them to rotate inward toward the blades. FIGS. 7A to 7C depict movement of the blade guard 120 toward the blades 104 as a user's hand 182 rotates the blade guard 120 inward from an initial position (FIG. 7A), through intermediate positions (FIG. 7B), to a terminal inward position (FIG. 7C). As shown in FIG. 7A, the user's hand contacts the blade guard 120 when the blade guard 120 is in the initial, relaxed position. As shown in FIG. 7B, the force from the user's hand 182 causes rotation of the blade guard 120 toward the blades 104 by moving the blade guard 120 through the intermediate positions between the initial position and the terminal inward position. Referring also to FIG. 6D, when the inward facing surface 128 of the blade guard 120 contacts the inner edge 163 of the frame 162, the blade guard 120 no longer is capable of rotating inward due to the contact and stops at its terminal inward position, as shown in FIG. 7C. At this terminal position, the user's hand 182 is in contact with the outward facing surface 130 of the blade guard 120, and the inward facing surface 128 of the blade guard 120 is positioned below the horizontal plane in which the blades 104 rotate.

In some implementations, when the blade guard 120 contacts the frame 162 in the terminal inward position, the blade guard 120 is supported by the frame 162, and thereby also is supported by the bumper 121 and the chassis 114. In this regard, a lift force in an upward direction, such as the force imparted by the user's hand 182, directed at the blade guard 120 is capable of lifting the robot lawnmower 100.

FIGS. 8A to 8C depict an example in which the robot lawnmower 100 is moving in a rearward direction across the lawn 102 while turning, thereby causing an object 184 to move under the lateral side 112R and contact the blade guard 120 at the outward facing surface 130 of the blade guard 120. The robot lawnmower 100 may perform such a movement pattern during a cutting operation as the robot lawnmower 100 moves autonomously across the lawn 102. As shown in FIG. 8A, the object 184 initially contacts the blade guard 120 when the blade guard 120 is in its initial position. As the robot lawnmower 100 turns, the robot lawnmower 100 and the object 184 move relative to one another such that the object 184 moves toward an underside of the robot lawnmower 100 where the blades 104 are located. As shown in FIG. 8B, the object 184 causes the blade guard 120 to rotate inward due to contact between the blade guard 120 and the object 184. If the object 184 has a sufficient height, as the robot lawnmower 100 continues to turn, the object 184 contacting the blade guard 120 causes the blade guard 120 to rotate until the inward facing surface 128 of the blade guard 120 contacts the inner edge 163 of the frame 162, and the blade guard 120 is no longer able to rotate. The blade guard 120 is thus in its terminal inward position, as shown in FIG. 8C.

While the blade guard 120 is in the terminal inward position in FIG. 8C, the force from the object 184 is transferred through the blade guard 120 to the bumper 121, thereby causing the bumper 121 to move relative to the chassis 114. In some implementations, this movement of the bumper 121 triggers the bump sensors associated with the bumper 121. The controller (e.g., the controller 158 shown in FIG. 3A) of the robot lawnmower 100 in turn responds to signals from the bump sensors by, for example, stopping the turning operation to prevent the object 184 from contacting the blades of the robot lawnmower 100.

In this regard, in some cases, objects of a predefined height may be sufficiently short such that the objects do not contact the bumper 121 at the lateral sides 112R, 112L. The bumper 121 at the lateral sides 112R, 112L has a height above the lawn 102, for example, between 3 centimeters and 7 centimeters (e.g., between 3 centimeters and 5 centimeters, between 4 centimeters and 6 centimeters, between 5 centimeters and 7 centimeters, approximately 5 centimeters, etc.). As a result, objects having height less 3 centimeters to 7 centimeters (e.g., 3 centimeters to 5 centimeters, 4 centimeters to 6 centimeters, 5 centimeters to 7 centimeters, etc.) may be capable of moving under the bumper 121 from the lateral sides 112R, 112L as the robot lawnmower 100 moves about the lawn 102.

However, even though these objects may be able to move under the bumper 121, an object (e.g., the object 184) that moves under the bumper 121 from the lateral sides 112R, 112L, in some implementations, contacts one of the blade guards 120R, 120L and causes the blade guard (e.g., the blade guard 120) to reach its terminal inward position. While the object 184 has a height small enough to move under the bumper 121, because the object 184 has a height sufficient to rotate the blade guard 120 to reach the terminal inward position, the object 184 causes the bumper 121 to move and thereby causes the bump sensor to trigger.

In some cases, the height of the object 184 does not cause the blade guard 120 to reach the terminal inward position. The blade guard 120 is configured such that an object does not cause the blade guard 120 to reach the terminal inward position (and trigger a bumper sensor event) only when the object has insufficient height to contact the blades of the robot lawnmower 100. In other words, the blade guard 120 only allows objects lower than the plane in which the blades 104 rotate to pass under the bumper 121. The height of such an object is below about 0.5 centimeters to 2.5 centimeters (e.g., 0.7 centimeters to 2 centimeters, 0.5 to 1.5 centimeters, etc.). In this regard, the minimum height of the blades above the lawn 102 is between 0.55 centimeters and 3 centimeters (e.g., between 0.8 centimeters and 2.5 centimeters, 1 centimeter and 2 centimeters, etc.) such that the blades would not contact such an object if the object reached the cutting area of the blades (e.g., the cutting areas 146R, 146L of FIGS. 3A and 3B).

Figure 9A:
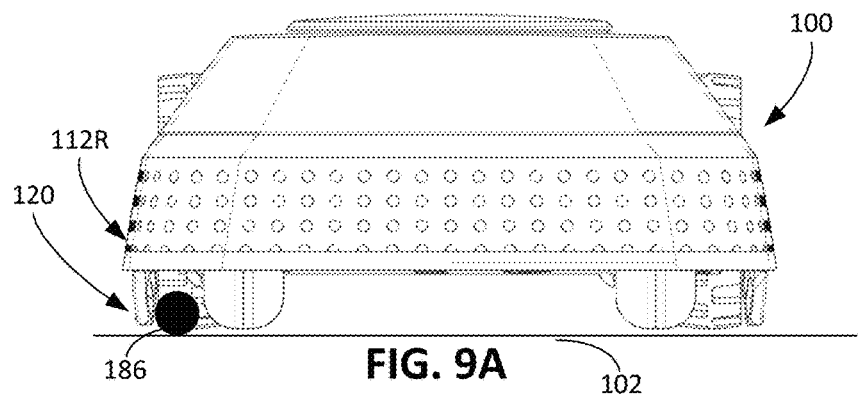
FIGS. 9A to 9C are front views depicting an autonomous robot lawnmower contacting between an object and an inward facing surface of a blade guard of the robot lawnmower.
Figure 9B:
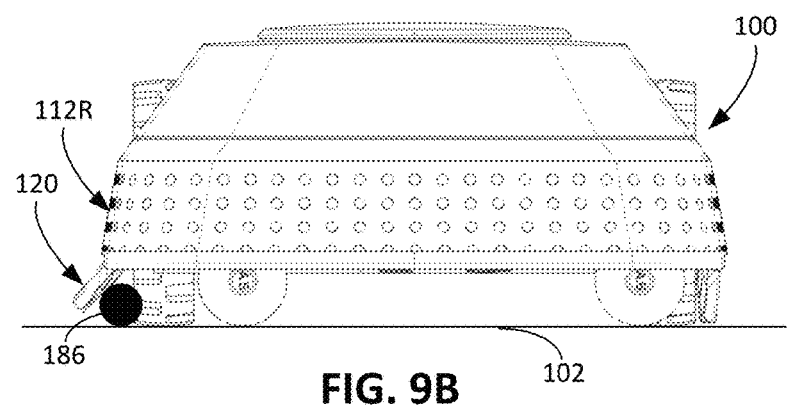
Figure 9C:
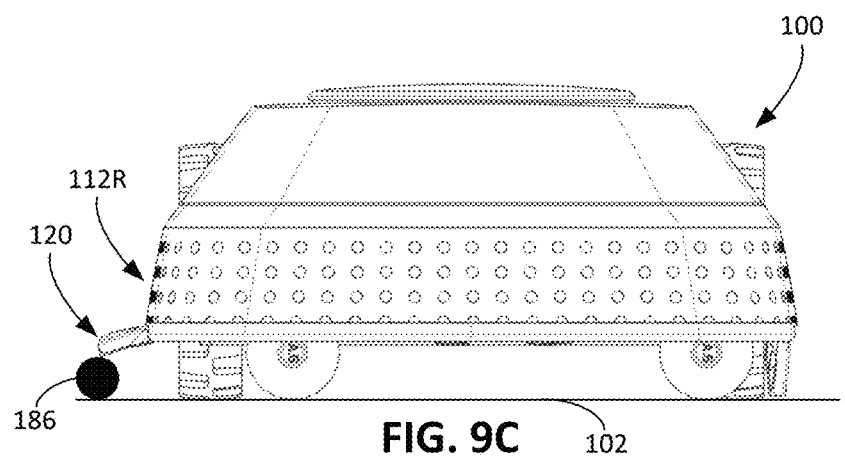

FIGS. 9A to 9C depict an example in which the robot lawnmower 100 is moving in a forward direction across the lawn 102 while turning, thereby causing an object 186 to move under the bumper 121 and to contact the blade guard 120 from at the inward facing surface 128 of the blade guard 120. As shown in FIG. 9A, the object 186 initially moves under the bumper 121 to an underside of the robot lawnmower 100. The object 186 then contacts the blade guard 120 at the inward facing surface 128 when the blade guard 120 is in its initial position. As the robot lawnmower 100 turns, the robot lawnmower 100 and the object 186 move relative to one another such that the object 184 moves away from the underside of the robot lawnmower 100 where the blades are located. As shown in FIG. 9B, the object 186 causes the blade guard 120 to rotate outward due to contact between the blade guard 120 and the object 186.

In some implementations, if the object 186 has a sufficient height, as the robot lawnmower 100 continues to turn, referring also to FIGS. 6B and 6D, the object 186 causes the blade guard 120 to rotate a sufficient amount such that the outward facing surface 130 of the blade guard 120 contacts the outer edge 165 of the frame 162 and is no longer able to rotate. The blade guard 120 is thus in its terminal outward position which causes the bump sensor to trigger under the continued application of force.

Figure 10A:
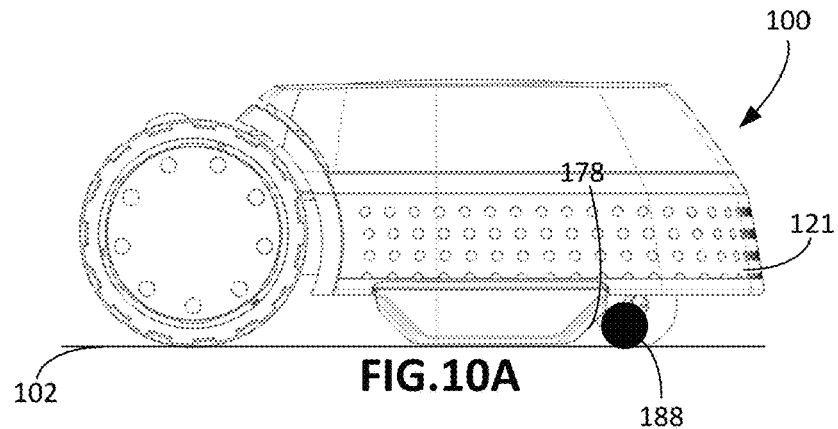
FIGS. 10A to 10C are front views depicting an autonomous robot lawnmower contacting between an object and a front facing surface of a blade guard of the robot lawnmower.
Figure 10B:
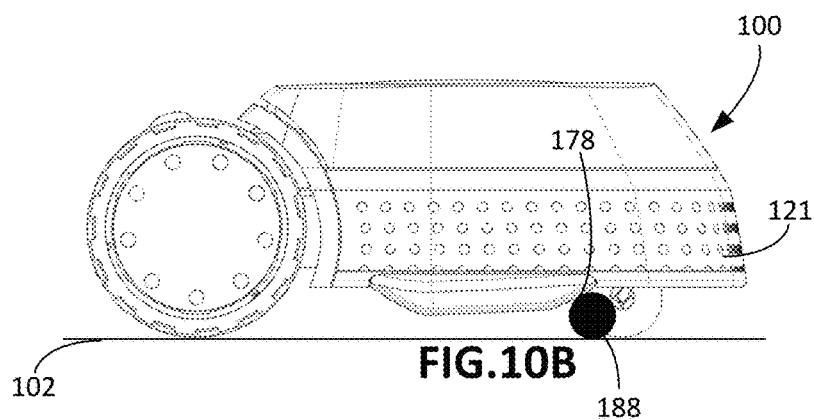
Figure 10C:
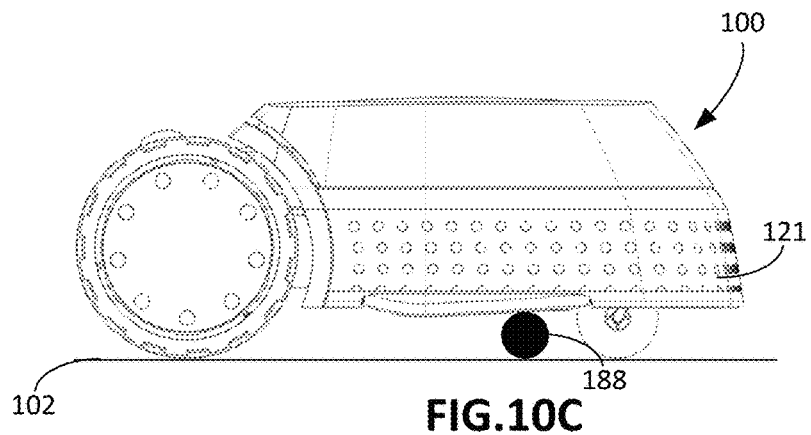

In some cases, the height of the object 184 does not cause the blade guard 120 to reach the terminal outward position. In some implementations, the blade guard 120 is configured such that an object would only apply force on the blade guard 120 that would trigger the bump sensor if the object would also potentially contact the blades. In this regard, the height of the object that would not cause the blade guard 120 to reach the terminal outward position is, for example, below about 0.5 centimeters to 2.5 centimeters (e.g., 0.7 centimeters to 2 centimeters, 0.5 to 1.5 centimeters, etc.). In such cases, the blade guard 120 being rotatable about an object enables the lower edge of the blade guard 120 to be positioned within a close distance to the lawn 102 and to be positioned closer to the lawn 102 than the bumper 121. In particular, the blade guard 120 can be positioned near the lawn 102 without causing damage to the blade guard 120 or causing the blade guard 120 to break off from the bumper 121 or the chassis 114 when the blade guard 120 contact an object, FIGS. 10A to 10C depict an example in which the robot lawnmower 100 is moving in a forward direction across the lawn 102, and object 188 moves under the bumper 121 and contacts the front facing surface 178 of the blade guard 120. As shown in FIG. 10A, the object 188 initially moves under the bumper 121 to an underside of the robot lawnmower 100. The object 188 then contacts the front facing surface 178 of the blade guard 120 when the blade guard 120 is in its initial position. As shown in FIG. 9B, as the robot lawnmower 100 continues to move in the forward direction, the contact between the object 188 and the blade guard 120 causes the blade guard 120 to recede into the bumper 121 of the robot lawnmower 100.

In some implementations, if the object 188 has a sufficient height, as the robot lawnmower 100 continues to move in the forward direction (referring also to FIG. 6B) the object 188 causes the blade guard 120 to translate a sufficient amount into the recess 167 such that the blade guard 120 contacts the portion of the frame 162 defining the recess 167. The blade guard 120 reaches it maximum height and is thus unable to translate further upward. The force on the blade guard 120 is transmitted through the blade guard 120 to the bumper 121. If the robot lawnmower 100 continues to move in the forward direction, the force from the object 188 triggers the bump sensor, and the controller of the robot lawnmower 100 navigates the robot lawnmower 100 to avoid contact with the object 188 by turning in an opposite direction and/or reversing drive direction, for example. In some implementations, the object does not have a height sufficient to cause the blade guard 120 to be unable to move further upward, e.g., both the blade guard 120 and the bumper 121 are able to pass over the object. In this regard, the robot lawnmower 100 would pass over the object without triggering the bump sensor and would continue the cutting operation on the lawn 102.

The objects 184, 186, 188 described with respect to FIGS. 8A to 8C, 9A to 9C, and 10A to 10C and other objects described herein include, for example, objects placed on the lawn 102 (e.g., a rock, a boulder, a ball, a sprinkler head, etc.), or uneven lawn surfaces.

A number of implementations have been described. Nevertheless, it will be understood that various modifications may be made. For example, in some implementations, the robot lawnmower 100 includes one, three, or more blade guards. In some cases, the robot lawnmower 100 includes a blade guard mounted at forward facing surface 156F of the bumper 121 to enable the blades to be mounted more proximate to the front of the robot lawnmower 100.

While the robot lawnmower 100 has been shown and described to include two cutting assemblies 138R, 138L, in some implementations, the robot lawnmower 100 includes a single cutting assembly with blades that are positionable to be proximate to both the left and right lateral sides 112R, 112L of the robot lawnmower 100. In some implementations, the robot lawnmower 100 includes additional cutting assemblies each including blades. The robot lawnmower 100 includes, for example, an array of four distinct cutting assemblies. In such a case, two of the cutting assemblies are, for example, positioned forward the other two cutting assemblies.

In some examples, the cutting assemblies 138R, 138L are movably mounted to the chassis 114 of the robot lawnmower 100 such that a height of the blades 104R, 104L above the lawn 102 are adjustable. For example, the housings 140R, 140L of the cutting assemblies 138R, 138L are mounted to the chassis 114. Heights of the housings 140R, 140L above the lawn 102 are adjustable relative to a height of the chassis 114 above the lawn 102. In some implementations, the heights of the housings 140R, 140L are independently adjustable.

Accordingly, other implementations are within the scope of the claims.

What is claimed is:

1. An autonomous robot lawnmower comprising:
    a drive supporting the robot lawnmower above a lawn and configured to maneuver the robot lawnmower about the lawn;
    a motorized lawn cutting assembly comprising one or more blades;
    a first blade guard movably mounted to a first lateral side of the robot lawnmower, positioned at least partially below a horizontal plane in which the one or more blades of the cutting assembly are located, and extending from the first lateral side of the robot lawnmower toward the lawn, the first blade guard being movable toward the one or more blades of the cutting assembly, wherein the first blade guard has a substantially planar front facing surface forming a non-perpendicular angle with a substantially planar outward facing surface of the first blade guard such that a rearward directed force on the front facing surface moves the first blade guard towards the one or more blades of the cutting assembly; and
    a second blade guard movably mounted to a second lateral side of the robot lawnmower and extending from the second lateral side toward the lawn, the second blade guard being movable toward the one or more blades of the cutting assembly, wherein the second blade guard has a front facing surface forming a non-perpendicular angle with an outward facing surface of the second blade guard such that a rearward directed force on the front facing surface of the second blade guard moves the second blade guard towards the one or more blades of the cutting assembly.

2. The robot lawnmower of claim 1, wherein the front facing surface of the first blade guard forms a non-perpendicular angle with a lower edge of the first blade guard such that the first blade guard translates upward in response to contact between the front facing surface of the first blade guard and an object on the lawn as the robot lawnmower moves in a forward direction across the lawn.

3. The robot lawnmower of claim 2, wherein the non-perpendicular angle between the front facing surface of the first blade guard and the lower edge of the first blade guard is between 100 and 170 degrees.

4. The robot lawnmower of claim 1, wherein the first blade guard is movable toward the one or more blades to position a portion of the first blade guard between a portion of the one or more blades of the cutting assembly and the lawn when an inwardly directed force is applied to the first blade guard.

5. The robot lawnmower of claim 4, wherein the portion of the first blade guard positioned between the portion of the one or more blades and the lawn when the inwardly directed force is applied to the first blade guard is positioned below a cutting circumference, the cutting circumference being defined by rotation of an outer tip of the one or more blades.

6. The robot lawnmower of claim 1, wherein the first blade guard comprises a spring rotatably mounting the first blade guard to the first lateral side of the robot lawnmower.

7. The robot lawnmower of claim 1, wherein the first blade guard comprises a spring translatably mounting the first blade guard to the first lateral side of the robot lawnmower.

8. The robot lawnmower of claim 1, wherein the first blade guard is movable away from the one or more blades of the cutting assembly when an outwardly directed force is applied to the first blade guard.

9. The robot lawnmower of claim 1, further comprising a bumper, the first blade guard being movably mounted to the bumper.

10. The robot lawnmower of claim 1, wherein the outward facing surface of the first blade guard includes a recessed portion and a raised portion surrounding the recessed portion.

11. The robot lawnmower of claim 1, wherein a cutting area is defined by operation of the one or more blades, the cutting area having a width between 75% and 95% of a distance between the first lateral side and the second lateral side of the robot lawnmower.

12. The robot lawnmower of claim 1, wherein the first blade guard is rotatable outward away from the one or more blades.

13. The robot lawnmower of claim 1, wherein:
    the outward facing surface of the first blade guard comprises an outward side facing portion, and
    the front facing surface of the first blade guard comprises a front facing portion and one or more front facing angled portions, the one or more front facing angled portions extending rearwardly and laterally from an outer edge of the front facing portion to the outward side facing surface of the first blade guard.

14. The robot lawnmower of claim 1, wherein an angle between an angled portion of the front facing surface of the first blade guard and the outward facing surface of the first blade guard is greater than 90 degrees.

15. An autonomous robot lawnmower comprising:
    a drive supporting the robot lawnmower above a lawn and configured to maneuver the robot lawnmower about the lawn;
    a motorized lawn cutting assembly comprising one or more blades; and
    a blade guard movably mounted to a lateral side of the robot lawnmower, positioned at least partially below a horizontal plane in which the one or more blades of the cutting assembly are located, and extending from the lateral side of the robot lawnmower toward the lawn, the blade guard being movable toward the one or more blades of the cutting assembly;
    wherein the blade guard has a rear facing surface forming a non-perpendicular angle with an outward facing surface of the blade guard such that a forward directed force on the rear facing surface moves the blade guard towards the one or more blades of the cutting assembly.

16. The robot lawnmower of claim 15, wherein the rear facing surface of the blade guard forms a non-perpendicular angle with a lower edge of the blade guard such that the blade guard translates upward in response to contact between the rear facing surface and an object on the lawn as the robot lawnmower moves in a rearward direction across the lawn.

17. The robot lawnmower of claim 16, wherein the non-perpendicular angle between the rear facing surface of the blade guard and the lower edge of the blade guard is between 100 and 170 degrees.

18. The robot lawnmower of claim 15, wherein the blade guard is movable toward the one or more blades to position a portion of the blade guard between a portion of the one or more blades of the cutting assembly and the lawn when an inwardly directed force is applied to the blade guard.

19. The robot lawnmower of claim 15, wherein:
the blade guard is a first blade guard,
the lateral side is a first lateral side, and
the robot lawnmower further comprises
a second blade guard movably mounted to a second lateral side of the robot lawnmower and extending from the second lateral side toward the lawn, the second blade guard being movable toward the one or more blades of the cutting assembly,
wherein the second blade guard has a rear facing surface forming a non-perpendicular angle with an outward facing surface of the second blade guard such that a forward directed force on the rear facing surface of the second blade guard moves the second blade guard towards the one or more blades of the cutting assembly.

20. The robot lawnmower of claim 15, wherein the blade guard comprises a spring rotatably mounting the blade guard to the lateral side of the robot lawnmower.

21. The robot lawnmower of claim 15, wherein the blade guard comprises a spring translatably mounting the blade guard to the lateral side of the robot lawnmower.

22. The robot lawnmower of claim 15, wherein:
the outward facing surface comprises an outward side facing portion, and
the rear facing surface comprises a rearward facing portion and one or more rearward facing angled portions, the one or more rearward facing angled portions extending forwardly and laterally from an outer edge of the rearward facing portion to the outward facing side surface of the blade guard.

23. The robot lawnmower of claim 15, wherein an angle between an angled portion of the rear facing surface and the outward facing surface is greater than 90 degrees.

24. The robot lawnmower of claim 15, wherein the rear facing surface is substantially planar, and the outward facing surface is substantially planar.

25. An autonomous robot lawnmower comprising:
a drive supporting the robot lawnmower above a lawn and configured to maneuver the robot lawnmower about the lawn;
a motorized lawn cutting assembly comprising one or more blades; and
a blade guard movably mounted to a lateral side of the robot lawnmower and extending from the lateral side of the robot lawnmower toward the lawn, the blade guard being movable toward the one or more blades of the cutting assembly;
wherein the blade guard has a front facing surface angled away from an outward facing surface of the blade guard such that a rearward directed force on the front facing surface moves the blade guard towards the one or more blades of the cutting assembly; and
wherein the blade guard is movable toward the one or more blades such that an inwardly directed force applied to the blade guard positions a portion of the blade guard between a portion of the one or more blades of the cutting assembly and the lawn and below a cutting circumference defined by a rotation of an outer tip of the one or more blades.

26. The robot lawnmower of claim 25, wherein the front facing surface of the blade guard angled away from a lower edge of the blade guard such that the blade guard translates upward in response to contact between the front facing surface and an object on the lawn as the robot lawnmower moves in a forward direction across the lawn.

27. The robot lawnmower of claim 26, wherein an angle between the front facing surface of the blade guard and the lower edge of the blade guard is between 100 and 170 degrees.

28. The robot lawnmower of claim 25, wherein:
the blade guard is a first blade guard,
the lateral side is a first lateral side, and
the robot lawnmower further comprises
a second blade guard movably mounted to a second lateral side of the robot lawnmower and extending from the second lateral side toward the lawn, the second blade guard being movable toward the one or more blades of the cutting assembly,
wherein the second blade guard has a front facing surface being angled away from an outward facing surface of the second blade guard such that a rearward directed force on the front facing surface of the second blade guard moves the second blade guard towards the one or more blades of the cutting assembly.

29. The robot lawnmower of claim 25, wherein the blade guard comprises a spring rotatably mounting the blade guard to the lateral side of the robot lawnmower.

30. The robot lawnmower of claim 25, wherein the blade guard comprises a spring translatably mounting the blade guard to the lateral side of the robot lawnmower.

31. The robot lawnmower of claim 25, wherein the blade guard is movable away from the one or more blades of the cutting assembly when an outwardly directed force is applied to the blade guard.

32. The robot lawnmower of claim 25, further comprising a bumper, the blade guard being movably mounted to the bumper.

* * * * *